US010863121B1

(12) United States Patent
DeWeert

(10) Patent No.: US 10,863,121 B1
(45) Date of Patent: Dec. 8, 2020

(54) SYSTEMS AND METHODS FOR SIMULATION

(71) Applicant: BAE Systems Information and Electronic Systems Integration Inc., Nashua, NH (US)

(72) Inventor: Michael J. DeWeert, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/518,427

(22) Filed: Jul. 22, 2019

(51) Int. Cl.
  *H04N 5/357* (2011.01)
(52) U.S. Cl.
  CPC ............... *H04N 5/35721* (2018.08)
(58) Field of Classification Search
  CPC ......... H04N 5/35721; A61B 5/00; G01J 1/16; G01J 1/42; G01J 3/00; G01J 3/46; G01J 3/50; G03H 3/00; H01J 31/49
  See application file for complete search history.

(56) References Cited

U.S. PATENT DOCUMENTS

| 5,756,990 | A * | 5/1998 | Watkins | G02B 13/14 250/252.1 |
| 2014/0104563 | A1 * | 4/2014 | Bakaraju | A61F 2/1616 351/159.41 |
| 2016/0299339 | A1 * | 10/2016 | Klapp | G02B 21/0072 |
| 2018/0002670 | A1 * | 1/2018 | Ishiwata | G01N 15/1475 |
| 2018/0024063 | A1 * | 1/2018 | Egner | G02B 21/00 359/386 |
| 2018/0165543 | A1 * | 6/2018 | Mody | G06K 9/6271 |
| 2018/0249100 | A1 * | 8/2018 | Watson | H04N 5/213 |

OTHER PUBLICATIONS

Stephen J. O'Neil, Motion System Design, url: https://www.machinedesign.com/motion-control/method-minimize-gear-backlash, Mar. 1, 2002.
R. G. Lane, et al., Simulation of a Kolmogorov Phase Screen, Waves in Random Media 2, 1992, pp. 209-224, IOP Publishing Ltd, UK.
Byron Formwlt, et al., Optimized Phase Screen Modeling for Optical Turbulence, Applied Optics, Aug. 2006, pp. 5657-5668, vol. 45, No. 22.
Rachel Rampy, et al., Production of Phase Screens for Simulation of Atmospheric Turbulence, 2012, 17 Pgs., https://arxiv.org/pdf/1209.4711.

* cited by examiner

*Primary Examiner* — Alexander Gee
(74) *Attorney, Agent, or Firm* — Sand, Sebolt & Wernow LPA; Scott J. Asmus

(57) ABSTRACT

Systems and methods for computationally simulating an optical image are provided. The systems and methods generate a simulated scene having at least one variable optical property, compute an optical transfer function (OTF) via at least one computed phase screen, express the OTF as a sum of at least one separable OTF, convolve the at least one separable OTF with the simulated scene to simulate electromagnetic (EM) fields of the optical image, and compute image intensities of the optical image from the simulated EM fields of the optical image.

15 Claims, 10 Drawing Sheets

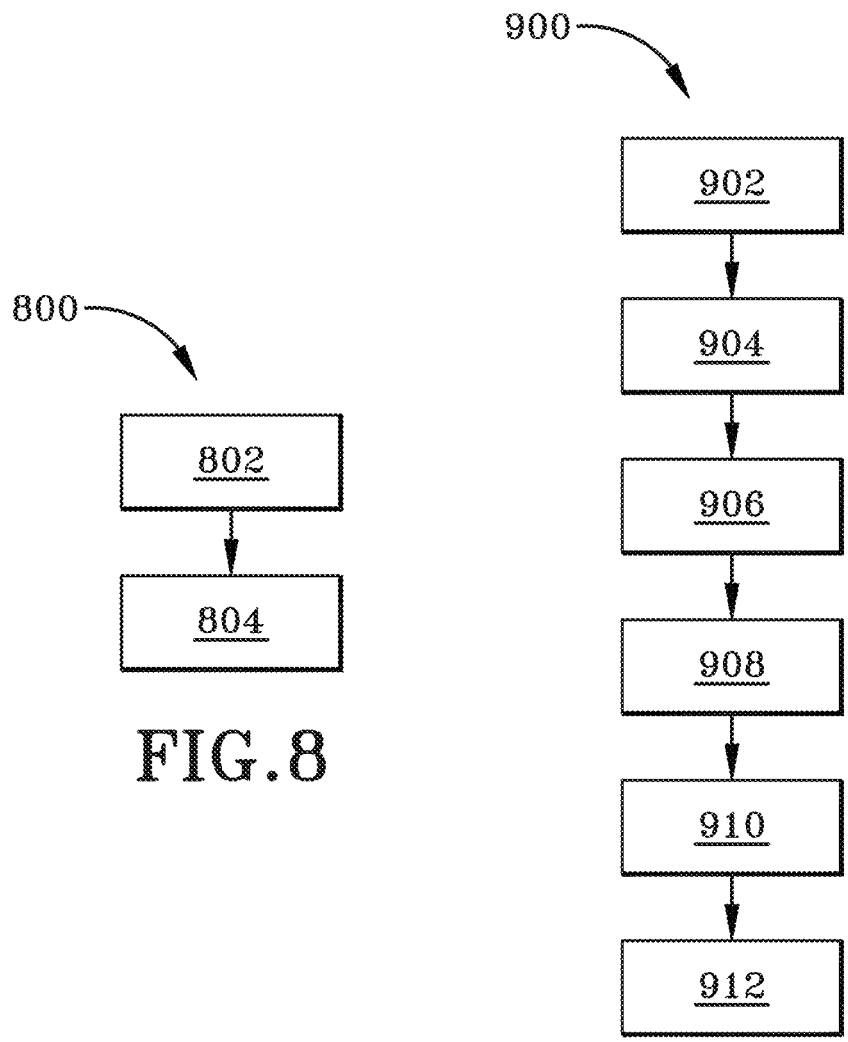

SYSTEMS AND METHODS FOR SIMULATION

TECHNICAL FIELD

The present disclosure relates generally to systems and methods for simulation. More particularly, the present disclosure relates to systems and methods for physics-based simulation. Specifically, the present disclosure relates to systems and methods for simulation utilizing optical transfer functions and computed phase screens.

BACKGROUND

Passive multi-spectral and hyperspectral imaging are effective for remote discrimination of threat objects; however, passive multi-spectral and hyperspectral imaging are limited by the availability of sunlight. For nighttime multi-spectral imaging, laser illuminators are an energy-efficient means of providing illumination at a set of mission-specific wavelengths. However, one drawback associated with laser illumination includes coherent speckle effects that impede precise spectral analysis. For example, laser illumination produces speckle that depends, at least in part, on various parameters, such as, for example, laser wavelength, surface texture, surface birefringence, laser coherence, atmospheric effects, and receiver optics including receiver polarization and optical transfer function (OTF). The speckle has unlimited dynamic range and is typically uncorrelated from band to band. As such, the parameters affecting speckle typically need to be accounted for to quantitatively predict the speckle effects on remote imagery.

One approach to physics-based image simulation is sequential ray tracing. However, sequential ray tracing is cumbersome to implement for capturing phase information, because microscopic changes in very long path lengths can yield very large modulations of phase. This is due to the shortness of the wavelength of light, which is sub-micron for visible light and microns for infrared light. Another drawback of sequential ray tracing is that it is cumbersome to capture phase effects of diffraction which is typically important for imaging.

SUMMARY

There remains a need in the art for improved systems and methods for simulation. The present disclosure addresses these and other issues.

In one aspect, an exemplary embodiment of the present disclosure may provide a method for computationally simulating an optical image comprising: generating a simulated scene having at least one variable optical property; computing an optical transfer function (OTF) via at least one computed phase screen; expressing the OTF as a sum of at least one separable OTF; convolving the at least one separable OTF with the simulated scene to simulate electromagnetic (EM) fields of the optical image; and computing image intensities of the optical image from the simulated EM fields of the optical image.

In one example, generating the simulated scene having at least one variable optical property further comprises: simulating at least one illuminating source; determining an optical phase of the at least one illuminating source; providing at least one object in the simulated scene; generating a roughness phase texture of the at least one object; determining fine-scale EM phase modulation of the roughness phase texture; illuminating the simulated scene with the at least one illuminating source; and determining at least one optical phase of the simulated scene based, at least in part, on the phase of the at least one illuminating source and the fine-scale EM phase modulation of the roughness phase texture.

The method further includes determining polarization Jones vectors of the at least one illuminating source; generating a polarization texture of the at least one object; determining fine-scale EM polarization modulation of the polarization texture; and determining polarization Jones vectors describing a polarization of the simulated scene based, at least in part, on the polarization Jones vectors of the at least one illuminating source and the fine-scale EM polarization modulation of the polarization texture.

The method further includes determining an optical reflectance of the at least one illuminating source; generating an optical reflectance texture of the at least one object; determining optical reflectance information of the optical reflectance texture; and determining an optical reflectance of the simulated scene based, at least in part, on the optical reflectance of the at least one illuminating source and the optical reflectance information of the optical reflectance texture.

The method further includes creating left and right matrices $M_X$ and $M_Y$ for each OTF of the sum of the at least one separable OTF; multiplying the left and right matrices $M_X$ and $M_Y$ by outgoing EM-fields at an object plane of a simulated optical system to create complex EM-field terms for each OTF of the sum of the at least one separable OTF; summing the complex EM-field terms computed from each OTF of the sum of the at least one separable OTF to create a net EM-field received at an image sensor of the simulated optical system; computing EM radiation intensity on the image plane of the simulated optical system; binning the EM radiation intensity on the image plane to a final resolution to create a speckle image; computing non-speckle noise simulation; and adding the non-speckle noise simulation to the speckle image to create the optical image. In one example, the left and right matrices $M_X$ and $M_Y$ are Toeplitz matrices.

In one example, expressing the OTF as the sum of at least one separable OTF is accomplished via analysis of optics geometry of a simulated optical system. In another example, expressing the OTF as the sum of at least one separable OTF is accomplished via analysis of atmospheric distortions. In yet another example, expressing the OTF as the sum of at least one separable OTF is accomplished via singular value decomposition (SVD).

The method further includes illuminating the simulated scene with at least one coherent light source, such as, for example at least one laser. In another example, the method further includes illuminating the simulated scene with at least one incoherent light source.

In another aspect, an exemplary embodiment of the present disclosure may provide a method of computing an optical transfer function (OTF) comprising: computing the OTF via at least one computed phase screen; and representing at least one phase-sensitive effect of a simulated optical system via the at least one computed phase screen. In one example, the at least one phase-sensitive effect is at least one effect of an ideal lens. In another example, the at least one phase-sensitive effect is at least one effect of a lens having at least one defocus parameter. In another example, the at least one phase-sensitive effect is at least one effect of a lens having at least one aberration. In yet another example, the at least one phase-sensitive effect is at least one effect of atmospheric turbulence.

In yet another aspect, an exemplary embodiment of the present disclosure may provide a method of convolving an optical transfer function (OTF) with a simulated scene comprising: computing a separability of the OTF; expressing the OTF as a sum of at least one separable OTF; creating left and right matrices $M_X$ and $M_Y$ for each OTF of the sum of the at least one separable OTF; multiplying the left and right matrices $M_X$ and $M_Y$ by outgoing EM-fields at an object plane of a simulated optical system to create complex EM-field terms for each OTF of the sum of the at least one separable OTF; and summing the complex EM-field terms computed from each OTF of the sum of the at least one separable OTF to create a net EM-field received at an image sensor of the simulated optical system. In one example, the left and right matrices $M_X$ and $M_Y$ are Toeplitz matrices. The method further includes computing the OTF via at least one computed phase screen.

In yet another aspect, an exemplary embodiment of the present disclosure may provide systems and methods for computationally simulating an optical image. The systems and methods generate a simulated scene having at least one variable optical property, compute an optical transfer function (OTF) via at least one computed phase screen, express the OTF as a sum of at least one separable OTF, convolve the at least one separable OTF with the simulated scene to simulate electromagnetic (EM) fields of the optical image, and compute image intensities of the optical image from the simulated EM fields of the optical image.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 8 is a flowchart in accordance with one embodiment of the present disclosure;

FIG. 9 is a flowchart in accordance with one embodiment of the present disclosure;

Similar numbers refer to similar parts throughout the drawings.

DETAILED DESCRIPTION

The systems and methods for simulation of the present disclosure have multiple uses, such as, for example, system design based on the results of the simulation as well as predicting the performance of various systems under various conditions. For example, the systems and methods of the present disclosure simulate the effects of multi-band speckle during hardware and algorithm development of various systems. Quantitatively predicting these effects and how they may be mitigated in system design saves development time and improves system performance. The systems and methods of the present disclosure is informed by real-world data, including, but not limited to, the birefringence of common sand types, and the observed sizes and correlation functions of multi-band speckle. The systems and methods of the present disclosure utilize a computed phase-screen approach, which is computationally faster than a sequential ray-tracing approach. Further, the systems and methods of the present disclosure can be reconfigured to run different parameters, such as, for example, different apertures and different optical transfer functions (OTFs) in order to optimize hardware design. Still further, the output of the systems and methods of the present disclosure include physics-realistic images that can then be used to refine multi-band and multi-polarization processing algorithms and/or instructions.

It should be noted that the systems and methods of the present disclosure utilize Polarization Jones Calculus for various computations. For elliptically-polarized light, assume the electric fields (E-fields) and magnetic fields (H-fields) are normal to the direction of propagation. Then, the E-field can be expressed as a two-dimensional complex vector in a plane normal to the light-propagation direction according to the following equation:

$$E_m = \begin{bmatrix} E_{0x} \exp(i\varphi_x) \\ E_{0y} \exp(i\varphi_y) \end{bmatrix} = \begin{bmatrix} \cos\theta \exp(i\phi/2) \\ \sin\theta \exp(-i\phi/2) \end{bmatrix} E_0, \quad \text{Equation (1)}$$

$$\therefore |E_m|^2 = |E_{0x}|^2 + |E_{0y}|^2 = |E_0|^2.$$

In Equation (1), $E_m$ is the portion of the E-field that varies slowly relative to the optical frequency $c/\lambda$. Shifts in polarization can be expressed via complex 2×2 Jones matrices operating on $E_m$. The system and methods of the present disclosure utilize a Jones matrix $\tau$, which includes the polarization-dependent throughput of a simulated aperture of a simulated optical system. Most optical systems will have $\tau=1$, where 1 is the identity matrix, but polarizers and pixilated devices, such as spatial-light modulators, cause the Jones matrix $\tau$ to vary. The Jones matrix formulation allows tracking of optical phase from point to point in a simulated image. This distinguishes the Jones formulation from Muller matrices, which are suitable for incoherent light, but cannot track the E-fields needed to compute coherence effects.

Figures 1, 1A:
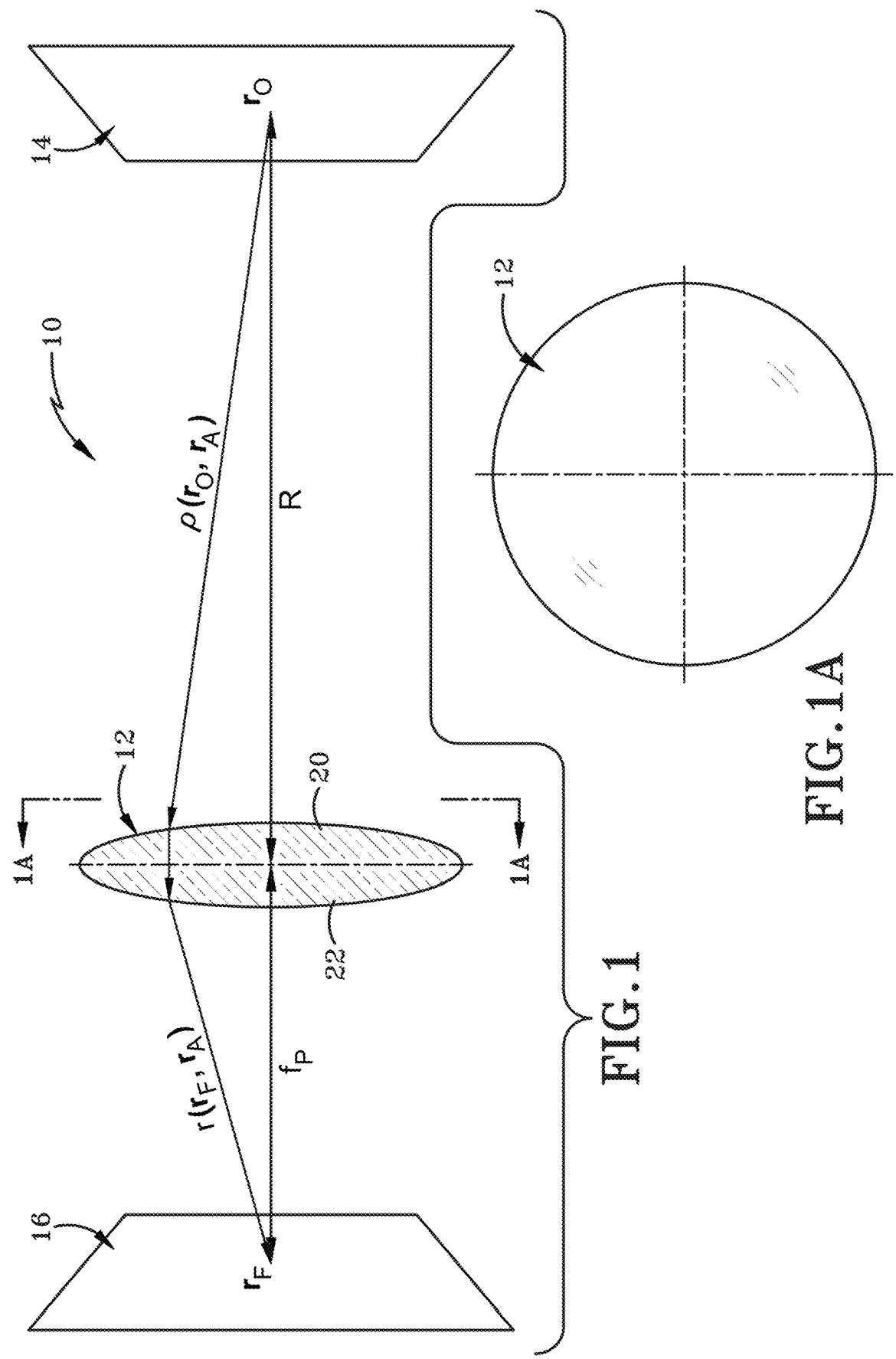
FIG. 1 is a diagrammatic view of a ray-tracing method of computing the effects of a lens in imaging.
FIG. 1A is a cross section view taken along line 1A-1A of FIG. 1.

FIG. 1 is a diagrammatic view of a ray-tracing method of computing the effects of a lens in imaging, which is shown generally as 10. FIG. 1 includes a lens 12, an object plane 14, and an image plane 16. With the ray-tracing method, a lens with a refractive index higher than the surrounding air bends ray paths. In the case of an ideal lens, all paths that start at a given point $r_O$ on the object plane 14 end up at the same point $r_F$ on the image plane 16. FIG. 1A is a cross section view taken along line 1A-1A of FIG. 1. FIG. 1 shows the path of one ray 18 through the lens 12. Refraction of the incident ray 18 at a first curved air-glass 20 interface redirects it along a new path inside the lens 12. Refraction of the incident ray 18 at a second glass-air interface 22 directs the ray along the exiting direction.

Figure 2:
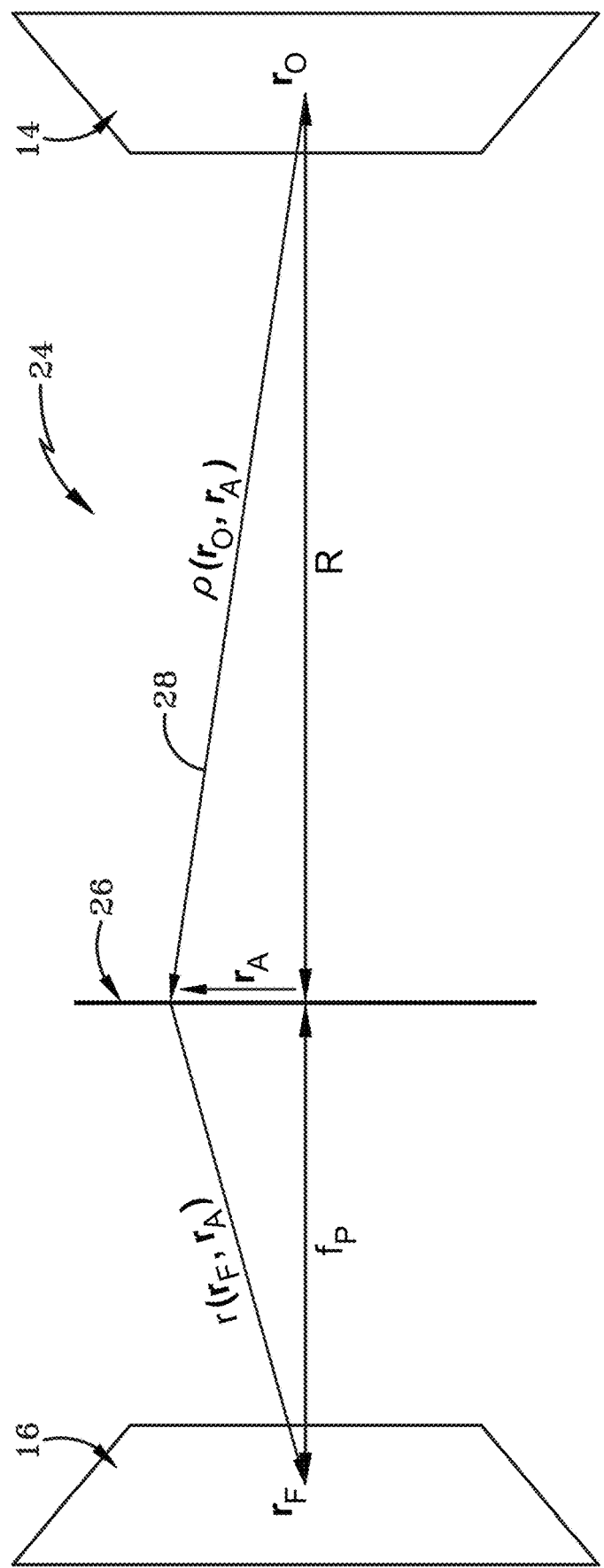
FIG. 2 is a diagrammatic view of a wave phase-shifting method, which may also be referred to as a computed phase-screen method, of computing the effects of a lens in imaging.

FIG. 2 is a diagrammatic view of a wave phase-shifting method, which may also be referred to as a computed phase-screen method, of computing the effects of a lens in imaging, which is shown generally at 24. With the phase screen method, a lens is replaced with a flat plate 26, which may also be referred to as aperture plane, which contains a phase-shifting function. As incident light waves impinge on an aperture of the flat plate 26, different parts of a wavefront 28 are advanced or retarded according to the local phase shift, so that waves of the wavefront 28 bend in the direction of the phase gradient. Stated otherwise, a lens is replaced with the flat plate 26 that introduces an optical phase-shift $\Delta\phi$ that varies with location $r_A$ in an aperture plane of the flat plate 26. Incident wavefronts 28 bend in the direction of the phase gradient, redirecting them to propagate in outgoing directions. In the case of an ideal positively-focusing lens, the phase shift varies with distance from the center of the lens according to Equation (2) below.

The ray-tracing method 10 and the phase-shifting method 24 can both be accurate; however, one advantage of the phase-screen method 24 over the ray-tracing method 10 is that it simplifies the computation of optical effects that are sensitive to optical phase. For an ideal lens, the phase shifts are:

$$\Delta\phi_{Lens} = \frac{2\pi}{\lambda}[t_{Lens}(1/n_{Lens} - 1/n_{Air}) + \Delta l_{Ideal\_Lens}(r_A, r_O), \quad \text{Equation (2)}$$

with:

$$\Delta l_{Ideal\_Lens}(r_O, r_A) = R\sqrt{1 + \left(\frac{r_O}{R}\right)^2} + f_P\sqrt{1 + \left(\frac{r_O}{R}\right)^2} - R\sqrt{1 + \left(\frac{r_O - r_A}{R}\right)^2} - f_P\sqrt{1 + \left(\frac{r_O}{R} + \frac{r_A}{f_P}\right)^2} \quad \text{Equation (3)}$$

where $\lambda$ is the wavelength of light, $t_{Lens}$ is the maximum thickness of the lens at its center, $n_{Lens}$ is the refractive index, $f_P$ is the distance from the aperture to the image plane, and R is the range to the object point. In a focusing optical system, the image plane may also be called the focal plane. Since $t_{Lens}(1/n_{Lens} - 1/n_{Air})$ is a constant applying equally to all light passing through the aperture, it has no material effect on imaging, and so $t_{Lens}(1/n_{Lens} - 1/n_{Air})$ will not be accounted for in the rest of the disclosure herein.

In Equation (3), the path length from an object point to a point on the aperture is:

$$\rho(r_O, r_A) = R\sqrt{1 + \left(\frac{r_O - r_A}{R}\right)^2}, \quad \text{Equation (4)}$$

and the path length from a point on the aperture to a point on the focal plane is:

$$r(r_F, r_A) = f_P\sqrt{1 + \left(\frac{r_F - r_A}{f_P}\right)^2}. \quad \text{Equation (5)}$$

To see the validity of Equation (3), consider the total optical path from a point $r_O$ on the object plane to a point $r_F$ on the image plane via an intermediate point $r_A$ on the aperture:

$$l_{Total}(r_O, r_A, r_F) = \rho(r_O, r_A) + r(r_F, r_A) + \Delta l(r_O, r_A) \quad \text{Equation (6)}$$

$$= \sqrt{R^2 + (r_O - r_A)^2} + \sqrt{f_P^2 + (r_F - r_A)^2} + \Delta l(r_O, r_A, r_F).$$

In the absence of diffraction, an ideal lens should make all paths equal when the image and object points are related by:

$$r_F = -\frac{f_P}{R}r_O, \quad \text{Equation (7)}$$

which represents an ideal geometric focus.

Substituting Equation (3) into Equation (6) results in:

$$l_{Total}(r_O, r_A, r_F) = \rho(r_O, r_A) + r(r_P, r_A) + \quad \text{Equation (8)}$$

$$\Delta l_{Ideal\_Lens}(r_O, r_A, r_F)$$

$$= (R + f_P)\sqrt{1 + \left(\frac{r_O}{R}\right)^2} + f_P\left[\sqrt{1 + \left(\frac{r_F - r_A}{f_P}\right)^2} - \sqrt{1 + \left(\frac{r_O}{R} + \frac{r_A}{f_P}\right)^2}\right].$$

According to Fermat's Principle, light follows the shortest optical path, which is minimized in Equation (8) when $r_F$ obeys Equation (7), giving:

$$l_{Total,Ideal}(r_O, r_A, r_F) = \quad \text{Equation (9)}$$

$$\rho(r_O, r_A) + r\left(-\frac{f_P}{R}r_O, r_A\right) + \Delta l_{Ideal\_Lens}(r_O, r_A) = (R + f_P)\sqrt{1 + \left(\frac{r_O}{R}\right)^2}.$$

Equation (9) shows that paths that obey Equation (7), and have the aperture phase shifts $\Delta l_{Ideal\_Lens}$, all have the same length, and that length is just the length of the straight line from $r_O$ to $r_F$, so that all the rays originating at a given point on the object plane focus to a single point on the image plane, in the limit of non-wave, (i.e., ray-tracing), geometric optics.

The lens paths $\Delta l_{Ideal\_Lens}$ in Equation (3) are for an ideal lens with perfect focus. Non-ideal imagers will focus the rays originating at $r_O$ in a volume about the ideal focal point, instead of at a single point. Though ideal lenses are used to illustrate the principles, the methods discussed in the present disclosure can be applied to any imaging system, ideal or non-ideal, and for reflective as well as refractive optics.

Table 1 below contains definitions of coordinates utilized by the systems and methods of the present disclosure, some of which are shown in FIG. 2.

TABLE 1

Definitions of coordinates

| | |
|---|---|
| Distance from object plane to aperture plane | R |
| Distance from aperture plane to image plane (also called the focal plane) | $f_P$ |
| Location on object plane | $r_O = (x_O, y_O)$ |
| Location on aperture plane | $r_A = (x_A, y_A)$ |
| Rectangular aperture-segment center | $r_C = (x_C, y_C)$ |
| Rectangular aperture-segment dimensions | $\Delta r_A = (a_X, a_Y)$ |
| Location on image plane (also called the focal plane) | $r_F = (x_F, y_F)$ |
| Pixel-center coordinate on focal plane | $r_P = (x_P, y_P)$ |

Scattering in the atmosphere redirects light rays, resulting in displacement and distortion of the images from the object plane. To model this, the atmosphere can be approximated as a computed phase screen at the lens aperture. Stated otherwise, the systems and methods of the present disclosure utilize a computed atmospheric phase screen to account for scattering caused by the atmosphere. In order to accomplish this, a relevant power spectrum P(k) is selected, such as one derived from the Kolmogorov spectrum for atmospheric turbulence. Other transparent materials, such as water, also scatter and distort light, as do interfaces or boundaries with transparent materials, such as an air-water interface. Such transparent-material-induced and transparent material-interface-induced effects can be modeled via numerical phase screens.

The vector k is a two-dimensional spatial frequency component in the aperture plane. For each k-component, a random Gaussian-distributed number with mean zero and standard deviation one is selected and multiplied by the square root of the power spectral density (PSD) to obtain an array of weights according to the following equation:

$$w(k) = \text{rand}_{Gaussian}(k) \times \sqrt{P(k)} \qquad \text{Equation (10)}.$$

The weights are then transformed back to real space to provide a path-variability simulation according to the following equation:

$$\Delta l_{Atmos}(r_A) = \int dk \, w(k) \exp(ik \cdot r_A) \qquad \text{Equation (11)}.$$

For a small aperture element in the vicinity of a central location $r_C$, a Taylor series expansion to second order gives:

$$\Delta l_{Atmos}(r_C, \Delta r_A) \approx \alpha_{Atmos}(r_C) + \beta_{Atmos}(r_C) \cdot \Delta r_A \qquad \text{Equation (12)}.$$

The effect of the tip/tilt factor $\beta(r_C)$ is to shift the line of sight from the ideal direction to a refracted direction, thus causing an image shift or image distortion. The zeroth-order phase shifts $\alpha(r_C)$ contribute phase noise that can reduce the contrast of coherent light in interferometric imaging. Equation (11) yields one instantaneous realization of the time-varying atmospheric distortions. For interferometric imaging, the detailed instantaneous state is important, not just the blur averaged over a long period of time.

The strategy of expanding aberrations in a series and adding them as terms to the total optical path also applies to the aberrations of non-ideal optics. For example, a set of lens aberrations may be locally approximated to first order at each element of an optical aperture divided into a multiplicity of sufficiently-small elements. In particular, if an otherwise perfect optical system is assembled so that the true distance $f_P$ to the focal plane deviates from the designed focal length, $f_{Designed}$, then:

$$\Delta l_{Optics}(r_O, r_A, r_F) = \Delta l_{Ideal\_Lens}(r_O, r_A) + \Delta l_{Aberr}(r_O, r_A, r_F) \qquad \text{Equation (13)},$$

with:

$$\Delta l_{Aberr}(r_O, r_A, r_F) = [\Delta l_{Optics}(r_O, r_A, r_F) - \Delta l_{Ideal\_Lens}(r_O, r_A)] = \qquad \text{Equation (14)}$$

$$\left\{ f_P \left[ \sqrt{1 + \left(\frac{r_F - r_A}{f_P}\right)^2} + \sqrt{1 + \left(\frac{r_O}{R}\right)^2} - \sqrt{1 + \left(\frac{r_O}{R} + \frac{r_A}{f_P}\right)^2} \right] - f_{Designed} \left[ \sqrt{1 + \left(\frac{r_F - r_A}{f_{Designed}}\right)^2} + \sqrt{1 + \left(\frac{r_O}{R}\right)^2} - \sqrt{1 + \left(\frac{r_O}{R} + \frac{r_A}{f_{Designed}}\right)^2} \right] \right\}.$$

For small defocus, and a small area of aperture centered on a point $r_C$, such that:

$$r_A = r_C + \Delta r_A \qquad \text{Equation (15)},$$

Equation (14) can be approximated by a first-order expansion in $\Delta r_A$ and $(f_P - f_{Designed})$ according to the following equation:

$$\Delta l_{Aberr}(r_O, r_C, r_F) \approx \{\alpha_{Defocus}(r_O) + \beta_{Defocus}(r_F) \cdot \Delta r_A\} \qquad \text{Equation (16)}$$

where $$\alpha_{Aberr}(r_O, r_C, r_F) \approx \alpha_{Defocus}(r_O, r_C, r_F) \approx \qquad \text{Equation (17)}$$

$$(f_P - f_{Designed}) \left[1 + \left(\frac{r_O}{R} + \frac{r_F}{f_P}\right) \cdot \frac{r_C}{f_P}\right],$$

and $$\beta_{Aberr}(r_O, r_C, r_F) \approx \beta_{Defocus}(r_O, r_F) = \qquad \text{Equation (18)}$$

$$\frac{(f_P - f_{Designed})}{f_P} \left(\frac{r_O}{R} + \frac{r_F}{f_P}\right).$$

Equation (16) through Equation (18) show that, for small defocus of an otherwise perfect optical system, the light is distributed about the nominal perfect-focus point $$\left(\frac{r_O}{R} + \frac{r_F}{f_P}\right) = 0,$$

with phase shifts dominated by $\Delta f = (f_P - f_{Designed})$. The dependence of $\alpha_{Aberr}$ on $r_C$ will contribute a contrast-reducing phase blur in interferometric imaging.

In general, aberrations will be described by more-complicated polynomial expressions for $\alpha_{Aberr}$ and the $\beta_{Aberr}$. The important feature of Equation (16) is that it expresses path-length deviations as a linear function of $\Delta r_A$, which facilitates diffraction computations.

Figure 3:
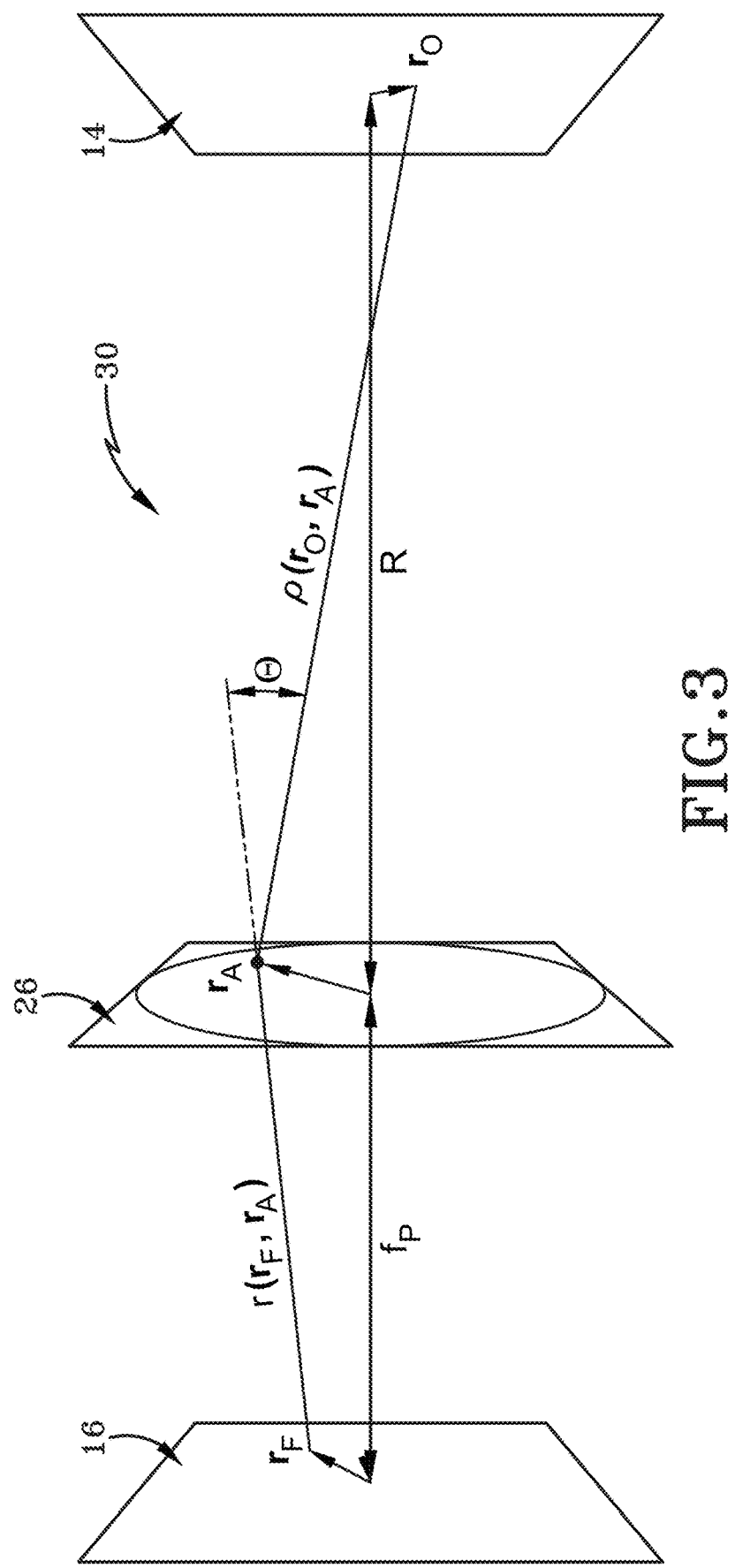
FIG. 3 is a diagrammatic view of imaging geometry with a parallel image plane, aperture plane, and object plane.

FIG. 3 is a diagrammatic view of imaging geometry with a parallel image plane 16, aperture plane 26, and object plane 14, which is shown generally at 30. The object plane 14-aperture plane 26 separation is R, and the image plane 16-aperture plane 26 separation is $f_P$.

Diffraction is important to account for in coherent imaging, and diffraction is computed using Kirchoff diffraction theory. FIG. 3 shows the geometry of light originating at an arbitrary point $r_O$ on the object plane 14 passing through an infinitesimal rectangular element about point $r_A$ on the aperture plane 26, then impinging on a point $r_F$ on the image plane 16. The total optical path is a combination of the geometric distances, the lens contribution, and the atmospheric deviations from a uniform refractive index.

To compute the diffracted image, first consider imaging through a single rectangular segment of the aperture, with image and object points off-axis. Using Kirchoff diffraction theory, the optical field for light with wavelength X at the image plane is an integral over the rectangular aperture-plane element.

More particularly, the optical-field contribution at a point on the image plane due to the radiance at a point on the object plane is given by an integral over an aperture element:

$$E_P(r_F \mid r_O, \lambda) = \quad \text{Equation (19)}$$

$$e^{-i\omega t} \int_{j_X p_X - \frac{1}{2}a_X}^{j_X p_X + \frac{1}{2}a_X} dx_A \int_{j_Y p_Y - \frac{1}{2}a_Y}^{j_Y p_Y + \frac{1}{2}a_Y} dy_A \frac{\tau(r_C)\varepsilon(r_O, \hat{n}, \lambda)K(\theta)}{\rho r \lambda}$$

$$T(r_C) \exp\left[i \frac{2\pi}{\lambda} l_{Total}(r_O, r_A, r_F)\right],$$

with aperture elements centered at:

$$r_C = (j_X p_X, j_Y p_Y) \quad \text{Equation (20),}$$

and total path lengths from object to image given by:

$$l_{Total}(r_O, r_A, r_F) = [\rho(r_O, r_A) + r(r_P, r_A) + \Delta l_{Optics}(r_O, r_A, r_F) + \Delta l_{Atmos}(r_O, r_A, r_F)] \quad \text{Equation (21).}$$

The phase of the complex exponential in the integrand of Equation (19) is composed of various phase terms:

$$\frac{2\pi}{\lambda}(\rho + r) = \text{phase of geometric path,} \quad \text{(Equation 22)}$$

$$\frac{2\pi}{\lambda}\Delta l_{Optics} = \text{phase screen of imaging optics} = \quad \text{Equation (23)}$$

$$\frac{2\pi}{\lambda}(\Delta l_{Ideal\_Lens} + \Delta l_{Aberr}),$$

and $$\frac{2\pi}{\lambda}\Delta l_{Atmos} = \text{atmospheric-propagation phase screen.} \quad \text{(Equation 24)}$$

By replacing the optics with a computed phase screen, the systems and methods of the present disclosure account for optical phase without the full overhead of ray-by-ray path tracing.

The radiance density $\varepsilon(r_O, \hat{n}(r_O, r_A), \lambda)$ is the density per unit area per steradian of polarized-radiance Jones vectors for light of wavelength $\lambda$ originating at point $r_O$ emitted in the direction $\hat{n}(r_O, r_A)$ that points from $r_O$ to $r_A$. As written in Equation (19), $\varepsilon$ is for a point source, with units of E-field per steradian.

The 2×2 Jones matrix ti describes the polarization shifts of the aperture element at $(j_X P_X, j_Y p_Y)$. Most optical systems will have $\tau=1$, but polarizers and pixilated devices, such as spatial-light modulators, cause it to vary. The variability of $\tau$ is assumed to be negligible over a single aperture element. In addition to complex polarization Jones shifts, each aperture element has a real-valued throughput $T(r_C)$, which ranges from zero to one.

Equation (19) introduced the division of the aperture into a multiplicity of rectangular elements. Each element has dimensions of $a_X \times a_Y$, and the elements are on a grid of points with separations (or pitch) of $p_X \times p_Y$. For most computations, $a_X = p_X$ and $a_Y = p_Y$, though for apertures that include pixelated elements such as spatial light modulators or digital light processors, there can be physical differences between the size and the pitch of the aperture elements. The integer pairs $(j_X, j_Y)$ index the locations of the aperture elements. In general, the aperture elements need not all have the same dimensions, and their separations can be unequal.

The following equations are definitions of quantities:

$$\rho^2(r_O, r_A) = R^2 + (x_O - x_A)^2 + (y_O - y_A)^2 \quad \text{Equation (25),}$$

and $$r^2(r_F, r_A) = f_P^2 + (x_F - x_A)^2 + (y_F - y_A)^2 \quad \text{Equation (26).}$$

The three-dimensional vector pointing from $r_A$ in the aperture plane to $r_O$ in the object plane is:

$$[(r_O - r_A), R] = [x_O - x_A, y_O - y_A, R] \quad \text{Equation (27),}$$

and the three-dimensional vector pointing from $r_P$ in the image plane to $r_A$ in the aperture plane is:

$$[(r_A - r_P), f_P] = [x_A - x_F, y_A - y_F, f_P] \quad \text{Equation (28).}$$

The angle between the two three-dimensional vectors defined in Equations (27) and (28) is: $\theta$=angle between $[(r_O - r_A), R]$ and $[(r_A - r_F), f_P]$, so that $$\cos\theta = \frac{[(r_O - r_A), R]}{|(r_O - r_A), R|} \cdot \frac{[(r_A - r_F), f_P]}{|(r_A - r_F), f_P|} = \quad \text{Equation (29)}$$

$$\frac{(r_O - r_A) \cdot (r_A - r_F) + R f_P}{\sqrt{|r_O - r_A|^2 + R^2} \sqrt{|r_A - r_F|^2 + f_P^2}}.$$

The Kirchoff factor $K(\theta)$ in Equation (18) accounts for obliquity of the view:

$$K(\theta) = (1 + \cos\theta)/2 \text{(Kirchoff factor)} \quad \text{Equation (30).}$$

To a sufficient approximation, the obliquity cosine is:

$$\cos\theta = \frac{[(r_O - r_A), R]}{|(r_O - r_A), R|} \cdot \frac{[(r_A - r_F), f_P]}{|(r_A - r_F), f_P|} \approx 1, \quad \text{Equation (31)}$$

so that the Kirchoff factor $K(\theta) \approx 1$.

To compute the optical field at a point $r_F=(x_F,y_F)$ on the focal plane due to the optical field at a point $r_O=(x_O,y_O)$ on the object, as viewed through a rectangular aperture of size $(a_X,a_Y)$ at point $r_C=(j_X p_X, j_Y p_Y)$, the systems and methods of the present disclosure utilize a Fresnel approximation. The components of the integrand in Equation (19), the ones in exponential terms (which are critical for computing optical phase) will be expanded to second order in $r_F$ and $r_O$, while non-exponential terms will be approximated to first order. Carrying out the expansions yields:

$$\frac{1}{\rho r} \approx \frac{1}{R\left[1+\frac{(r_O-r_A)^2}{2R^2}\right]f_P\left[1+\frac{(r_P-r_A)^2}{2f_P^2}\right]} \approx \frac{1}{Rf_P} \quad \text{Equation (32)}$$

(to first order), $$\rho \approx R + \frac{1}{R}\left(\frac{1}{2}|r_O|^2 + \frac{1}{2}|r_A|^2 - r_O \cdot r_A\right) = \quad \text{Equation (33)}$$

$$R\left[1 + \frac{(x_O-x_A)^2 + (y_O-y_A)^2}{2R^2}\right],$$

$$r \approx f_P + \frac{1}{f_P}\left(\frac{1}{2}|r_F|^2 + \frac{1}{2}|r_A|^2 - r_F \cdot r_A\right) = \quad \text{Equation (34)}$$

$$f_P\left[1 + \frac{(x_F-x_A)^2 + (y_F-y_A)^2}{2f_P^2}\right],$$

and $$l_{Total\_Ideal}(r_O, r_A, r_F) = \quad \text{Equation (35)}$$

$$\rho(r_O, r_A) + r(r_F, r_A) + \Delta l_{Ideal\_Lens}(r_O, r_A) \approx$$

$$(R+f_P) + \frac{1}{2}\left(\frac{|r_O|^2}{R} + \frac{|r_F|^2}{f_P}\right) + \left(\frac{r_F}{f_P} - \frac{r_O}{R}\right) \cdot r_A.$$

Expanding Equation (35) about $r_O$ with $r_A=(r_C+\Delta r_A)$ gives:

$$l_{Total\_Ideal}(r_O, r_C, r_F) = \quad \text{Equation (36)}$$

$$\rho(r_O, r_A) + r(r_F, r_A) + \Delta l_{Ideal\_Lens}(r_O, r_A) \approx (R+f_P) +$$

$$\frac{1}{2}\left(\frac{|r_O|^2}{R} + \frac{|r_F|^2}{f_P}\right) + \left(\frac{r_F}{f_P} - \frac{r_O}{R}\right) \cdot r_C + \left(\frac{r_F}{f_P} - \frac{r_O}{R}\right) \cdot \Delta r_A.$$

With the approximations in Equation (36), Equation (12), and Equation (16), the total path length is given by:

$$l_{Total} = l_{Total\_Ideal} + \Delta l_{Aberr} + \Delta l_{Atmos} \quad \text{Equation (37)}$$

$$\approx \left\{\begin{array}{l} (R+f_P) + \frac{1}{2}\left(\frac{|r_O|^2}{R} + \frac{|r_F|^2}{f_P}\right) + \left(\frac{r_F}{f_P} - \frac{r_O}{R}\right) \cdot \\ r_C + (\alpha_{Aberr} + \alpha_{Atmos}) + \\ \left[\left(\frac{r_F}{f_P} - \frac{r_O}{R}\right) + \beta_{Aberr} + \beta_{Atmos}\right] \cdot \Delta r_A \end{array}\right\}$$

where the center of an aperture element is:

$$r_C = (j_X p_X, j_Y p_Y) \quad \text{Equation (38).}$$

Setting $\alpha = (\alpha_{Aberr} + \alpha_{Atmos})$ and $(\beta_X, \beta_Y) = \beta = (\beta_{Aberr} + \beta_{Atmos})$, and substituting Equations (30), (32), and (38) into the E-field Equation (19) gives:

$$E_P(r_P | r_O, \lambda) = \frac{e^{(-i\omega t + i\frac{2\pi}{\lambda}(R+f_P))}}{Rf_P\lambda} \quad \text{Equation (39)}$$

$$\left\{\begin{array}{l} T(r_C)\tau(r_C)\varepsilon(r_O,\hat{n},\lambda)\exp \\ \left[i\frac{2\pi}{\lambda}\left\{\frac{1}{2}\left(\frac{|r_O|^2}{R} + \frac{|r_F|^2}{f_P}\right) + \right. \right. \\ \left. \left. \left(\frac{r_F}{f_P} - \frac{r_O}{R}\right) \cdot r_C + \alpha\right\}\right] \times \\ \int_{-\frac{1}{2}a_X}^{+\frac{1}{2}a_X} dx_A \exp\left[-i\frac{2\pi}{\lambda}\left(\frac{x_O}{R} + \frac{x_F}{f_P} + \beta_X\right)x_A\right] \times \\ \int_{-\frac{1}{2}a_Y}^{+\frac{1}{2}a_Y} dy_A \exp\left[-i\frac{2\pi}{\lambda}\left(\frac{y_O}{R} + \frac{y_F}{f_P} + \beta_Y\right)y_A\right] \end{array}\right\}.$$

The integral over the x-dimension of the rectangular aperture segment is:

$$\int_{-\frac{1}{2}a_X}^{+\frac{1}{2}a_X} dx_A \exp\left[-i\frac{2\pi}{\lambda}\left(\left(\frac{x_O}{R} + \frac{x_F}{f_P} + \beta_X\right)x_A\right)\right] = \quad \text{Equation (40)}$$

$$a_X \text{sinc}\left[\pi\frac{a_X}{\lambda}\left(\frac{x_O}{R} + \frac{x_F}{f_P} + \beta_X\right)\right]$$

where $\text{sinc}(q) \equiv \sin(q)/q$. A similar equation applies for the y-direction. With the integrals over the aperture element included, Equation (39) is:

$$E_P(r_F | r_O, \lambda) = \frac{a_X a_Y}{Rf_P\lambda} e^{(-i\omega t + i\frac{2\pi}{\lambda}(R+f_P))} \quad \text{Equation (41)}$$

$$T(r_C)\exp\left[i\frac{2\pi}{\lambda}\left\{\frac{1}{2}\frac{|r_O|^2}{R} + \frac{1}{2}\frac{|r_F|^2}{f_P} + \alpha\right\}\right]\tau(r_C)$$

$$\varepsilon(r_O, r_C, \lambda) \times \exp\left[-i\frac{2\pi}{\lambda}\left(\left(\frac{x_O}{R} + \frac{x_F}{f_P} + \beta_X\right)(j_X p_X)\right)\right]$$

$$\text{sinc}\left[\pi\frac{a_X}{\lambda}\left(\left(\frac{x_O}{R} + \frac{x_F}{f_P} + \beta_X\right)\right)\right] \times$$

$$\exp\left[-i\frac{2\pi}{\lambda}\left(\left(\frac{y_O}{R} + \frac{y_F}{f_P} + \beta_Y\right)(j_Y p_Y)\right)\right]$$

$$\text{sinc}\left[\pi\frac{a_Y}{\lambda}\left(\left(\frac{y_O}{R} + \frac{y_F}{f_P} + \beta_Y\right)\right)\right].$$

To check for correctness of the approach for small rectangular aperture segments, consider the intensity due to a single aperture segment, at a point on the image plane, given by:

$$i_P(r_F | r_O, \lambda) = \quad \text{Equation (42)}$$

$$E_P(r_F | r_O, \lambda) \cdot E_P^*(r_F | r_O, \lambda) \approx \left(\frac{a_X a_Y}{Rf_P\lambda}\right)^2 T^2(r_C)$$

$$|\tau(r_C) \cdot \varepsilon(r_O, r_C, \lambda)|^2 \times \text{sinc}^2\left[\pi\frac{a_X}{\lambda}\left(\frac{x_O}{R} + \frac{x_F}{f_P} + \beta_X\right)\right] \times$$

$$\text{sinc}^2\left[\pi\frac{a_Y}{\lambda}\left(\frac{y_O}{R} + \frac{y_F}{f_P} + \beta_Y\right)\right].$$

Equation (42) is a rectangular-aperture-diffraction function, centered on the point where $$\left(\frac{r_O}{R} + \frac{r_F}{f_P} + \beta\right) = 0.$$

In the absence of atmospheric or lens distortion ($\alpha=0$, and $\beta=0$), the diffraction pattern appears independent of the location $r_C=(j_X p_X, j_Y p_Y)$ of the aperture segment. Those skilled in the art will recognize that Equation (42) thus represents the correct behavior of the intensity for a perfect optical system. Note that polarization does not change the shape of the diffraction pattern, but the throughput of the aperture may be polarization dependent. Assuming that the throughput is independent of polarization simplifies exemplary cases, though polarization-independence is not necessary for the simulation method, and it should be noted that the simulation method works for both coherent and incoherent light.

In interferometric imaging, including shearography, the quantity of interest is the optical field, not just the intensity. Thus, not just the intensity of $\varepsilon(r_O, r_C, \lambda)$ is modeled, but its phase is modeled as well. $\varepsilon(r_O, r_C, \lambda)$ is the source strength (E-field) at the wavelength $\lambda$, at the point $r_O$ emitting toward the point $r_C$ on the aperture plane. It is assumed that the directionality varies too little to matter over aperture of the receiver, treating each point as a distant isotropic emitter, so that:

$$r_O, r_C, \lambda) = \varepsilon(r_O, \lambda) \qquad \text{Equation (43)}.$$

In the remainder of the present disclosure, it is assumed that the aperture is continuous, so that the pitch $(p_X, p_Y)$ of the sub-elements equals the element dimensions $(a_X, a_Y)$. This is not a limitation on the system and methods of the present disclosure, since the aperture can always be divided finely enough that the throughput terms $T(r_C)$ can simulate any less-than-unity fill factors of aperture elements.

For multiple aperture segments, the optical field at a point on the image plane, due to light from a single point on the object plane, is given by:

$$E_P(r_F | r_O, \lambda) \approx \left(\frac{a_X a_Y}{R f_P \lambda}\right) \exp\left[-i\frac{2\pi}{\lambda}(ct-(R+f_P))\right] \qquad \text{Equation (44)}$$

$$\exp\left[i\frac{\pi}{\lambda}\frac{r_F^2}{f_P}\right] \exp\left[i\frac{\pi}{\lambda}\frac{r_O^2}{R}\right] \times \sum_{j_X=-N_X/2}^{N_X/2-1} \sum_{j_Y=-N_Y/2}^{N_Y/2-1}$$

$$\left\{ \begin{array}{l} T(r_C)\tau(r_C)\varepsilon(r_O, \lambda)\exp\left[i\frac{\pi}{\lambda}\alpha(r_C)\right] \times \\ \text{sinc}\left[\pi\frac{a_X}{\lambda}\left(\frac{x_O}{R} + \frac{x_F}{f_P} + \beta_X(r_C)\right)\right] \times \\ \exp\left[-i\frac{2\pi}{\lambda}\left[\left(\frac{x_O}{R} + \frac{x_F}{f_P} + \beta_X(r_C)\right)j_X p_X\right]\right] \times \\ \text{sinc}\left[\pi\frac{a_Y}{\lambda}\left(\frac{y_O}{R} + \frac{y_F}{f_P} + \beta_Y(r_C)\right)\right] \times \\ \exp\left[-i\frac{2\pi}{\lambda}\left[\left(\frac{y_O}{R} + \frac{y_F}{f_P} + \beta_Y(r_C)\right)j_Y p_Y\right]\right] \end{array} \right\}.$$

For computational convenience, the number of aperture segments $N_X$ and $N_Y$ along each axis of the aperture plane is odd, with $(j_X=0, j_Y=0)$ at the center of the aperture. Assuming that $N_X$ and $N_Y$ are odd has no effect on computational accuracy, since aperture elements with zero throughput can be added with no effect.

Summing over all emitters in the object plane gives the total optical field at $r_F$ on the image plane:

$$E_P(r_F |, \lambda) \exp\left(-i\frac{\pi}{\lambda}\frac{r_F^2}{f_P}\right) \approx \qquad \text{Equation (45)}$$

$$\frac{a_X a_Y}{R f_P \lambda} e^{[-i\frac{2\pi}{\lambda}(ct-(R+f_P))]} \sum_{x_O} \sum_{y_O} \times \sum_{j_X=-N_X/2}^{N_X/2-1} \sum_{j_Y=-N_Y/2}^{N_Y/2-1}$$

$$\left\{ \begin{array}{l} T(r_C)\exp\left[i\frac{\pi}{\lambda}\alpha(r_C)\right] \times \\ \text{sinc}\left[\pi\frac{a_X}{\lambda}\left(\frac{x_O}{R} + \frac{x_F}{f_P} + \beta_X(r_C)\right)\right] \times \\ \exp\left[-i\frac{2\pi}{\lambda}\left(\frac{x_O}{R} + \frac{x_F}{f_P} + \beta_X(r_C)\right)j_X p_X\right] \times \\ \text{sinc}\left[\pi\frac{a_Y}{\lambda}\left(\frac{y_O}{R} + \frac{y_F}{f_P} + \beta_Y(r_C)\right)\right] \times \\ \exp\left[-i\frac{2\pi}{\lambda}\left(\frac{y_O}{R} + \frac{y_F}{f_P} + \beta_Y(r_C)\right)j_Y p_Y\right] \end{array} \right\}$$

$$\tau(r_C)\varepsilon(r_O, \lambda)\exp\left(i\frac{\pi}{\lambda}\frac{r_O^2}{R}\right).$$

In most laser remote-sensing applications, the exposure times are much longer than the period $\lambda/c$ of a light wave. Thus, the exposure time will integrate the transported energy over many light-wave periods. Because of this, the rapidly-varying factor $$\exp\left[-i\frac{2\pi}{\lambda}(ct-(R+f_P))\right]$$

in Equation (45) can be dropped, and only the (implicitly) slowly-varying optical-field dependencies retained. In addition, typical remotely-sensed surfaces are microscopically rough, adding many waves of phase variability, so the large constant phase factor $\exp(i(\pi r_O^2)/(\lambda R))$ can be absorbed into the object-plane E-fields. Likewise, the optical assembly typically has microscopic surface roughness that can be calibrated out of the image, so that the phase factors $\exp(i(\pi r_F^2)/(\lambda f_P))$ can be absorbed into the image-plane E-fields. In anticipation of discretizing the object-plane and image-plane computations, the next step in mathematical development is to define an optical field density per unit area on the object plane:

$$\varepsilon_O(r_O, \lambda, t)\Delta x_O \Delta y_O = \left[e^{i\frac{\pi R}{\lambda}(\frac{r_O}{R})^2} \varepsilon_O(r_O, \lambda, t)\right], \qquad \text{Equation (46)}$$

and, likewise, an optical field on the image plane becomes:

$$E_F(r_F, \lambda, t) = e^{i\frac{\pi f_P}{\lambda}(\frac{r_F}{f_P})^2} E(r_F, \lambda, t). \qquad \text{Equation (47)}$$

Substituting Equations (46) and (47) into Equation (45) then gives:

$$E_F(r_F, \lambda, t) \approx \qquad \text{Equation (48)}$$

$$\left(\frac{N_X a_X N_Y a_Y}{R \lambda f_P}\right) \sum_{x_O} \sum_{y_O} Q\left(\frac{r_O}{R}, \frac{r_F}{f_P}, t\right) \varepsilon_O(r_O, \lambda, t).$$

Next, re-express the focal-plane coordinates in object-plane units:

$$r_P = \frac{R}{f_P} r_F, \quad \text{Equation (49)}$$

so that Equation (47) becomes:

$$E_F(r_P, \lambda, t) \approx \quad \text{Equation (50)}$$

$$\left(\frac{N_X a_X N_Y a_Y}{R \lambda f_P}\right) \sum_{x_O} \sum_{y_O} Q\left(\frac{r_O}{R}, \frac{r_P}{R}, t\right) \varepsilon_O(r_O, \lambda, t),$$

where Q is the complex optical transfer function (OTF):

$$Q\left(\frac{r_O}{R}, \frac{r_P}{R}\right) \equiv \quad \text{Equation (51)}$$

$$\frac{1}{N_X N_Y} \sum_{j_X = -N_X/2}^{N_X/2-1} \sum_{j_Y = -N_Y/2}^{N_Y/2-1} T(r_C) \exp\left(i \frac{\pi}{\lambda} \alpha\left(\left(\frac{r_O + r_P}{R}\right), r_C\right)\right) \times$$

$$\left\{\begin{array}{l} \mathrm{sinc}\left[\pi \frac{a_X}{\lambda}\left(\frac{x_O + x_P}{R} + \beta_X\left(\left(\frac{r_O + r_P}{R}\right), r_C\right)\right)\right] \times \\ \exp\left[-i \frac{2\pi}{\lambda}\left(\frac{x_O + x_P}{R} + \beta_X\left(\left(\frac{r_O + r_P}{R}\right), r_C\right)\right) x_C\right] \times \\ \mathrm{sinc}\left[\pi \frac{a_Y}{\lambda}\left(\frac{y_O + y_P}{R} + \beta_Y\left(\left(\frac{r_O + r_P}{R}\right), r_C\right)\right)\right] \times \\ \exp\left[-i \frac{2\pi}{\lambda}\left(\frac{y_O + y_P}{R} + \beta_Y\left(\left(\frac{r_O + r_P}{R}\right), r_C\right)\right) y_C\right] \end{array}\right\} \tau(r_C).$$

Equation (48) is the general mathematical expression for the E-field simulations. Substituting in the linearized optical and atmospheric parameters into Equation (51) gives:

$$Q\left(\frac{r_O}{R}, \frac{r_P}{R}\right) = \frac{1}{N_X N_Y} \quad \text{Equation (52)}$$

$$\sum_{j_X = -N_X/2}^{N_X/2-1} \sum_{j_Y = -N_Y/2}^{N_Y/2-1} T(r_C) \exp\left(i \frac{\pi}{\lambda}(\alpha_{Defocus} + \alpha_{Atmos}(r_C))\right) \times$$

$$\left\{\begin{array}{l} \mathrm{sinc}\left[\pi \frac{a_X}{\lambda}\left(\frac{x_O + x_P}{R} + \beta_{X,Defocus} + \beta_{X,Atmos}(r_C)\right)\right] \times \\ \exp\left[-i \frac{2\pi}{\lambda}\left(\frac{x_O + x_P}{R} + \beta_{X,Defocus} + \beta_{X,Atmos}(r_C)\right) x_C\right] \times \\ \mathrm{sinc}\left[\pi \frac{a_Y}{\lambda}\left(\frac{y_O + y_P}{R} + \beta_{Y,Defocus} + \beta_{Y,Atmos}(r_C)\right)\right] \times \\ \exp\left[-i \frac{2\pi}{\lambda}\left(\frac{y_O + y_P}{R} + \beta_{Y,Defocus} + \beta_{Y,Atmos}(r_C)\right) y_C\right] \end{array}\right\} \tau(r_C).$$

Substituting in Equations (17) and (18) for the defocus parameters then gives:

$$Q\left(\frac{r_O + r_P}{R}\right) = \frac{1}{N_X N_Y} \sum_{j_X = -N_X/2}^{N_X/2-1} \sum_{j_Y = -N_Y/2}^{N_Y/2-1} T(r_C) \quad \text{Equation (53)}$$

$$\exp\left(i \frac{\pi}{\lambda}((f_P - f_{Designed}) + \alpha_{Atmos}(r_C))\right) \times$$

$$\left\{\begin{array}{l} \mathrm{sinc}\left[\pi \frac{a_X}{\lambda}\left(\left(\frac{x_O + x_P}{R}\right)\left[1 + \frac{(f_P - f_{Designed})}{f_P}\right] + \beta_{X,Atmos}(r_C)\right)\right] \times \\ \exp\left[-i \frac{2\pi}{\lambda}\left(\left(\frac{x_O + x_P}{R}\right) + \beta_{X,Atmos}(r_C)\right) x_C\right] \times \\ \mathrm{sinc}\left[\pi \frac{a_Y}{\lambda}\left(\left(\frac{y_O + y_P}{R}\right)\left[1 + \frac{(f_P - f_{Designed})}{f_P}\right] + \beta_{Y,Atmos}(r_C)\right)\right] \times \\ \exp\left[-i \frac{2\pi}{\lambda}\left(\left(\frac{y_O + y_P}{R}\right) + \beta_{Y,Atmos}(r_C)\right) y_C\right] \end{array}\right\}$$

$$\tau(r_C).$$

In phase-sensitive imaging, such as in imaging a scene that includes optical speckle, Equation (48) can be used to compute the intensity per unit area at the image plane:

$$i_F(r_F, \lambda, t) = E_F(r_F, \lambda, t) \cdot E_F(r_F, \lambda, t)^* \quad \text{Equation (54).}$$

The intensity in a pixel is then the integral over the pixel area:

$$I_{Pixel}(r_{Pixel}, \lambda, t) = \int_{Pixel} \int dr_F \, i_F(r_F, \lambda, t). \quad \text{Equation (55)}$$

The interpretation of Equation (48) is that the E-fields, weighted by the OTFs, are summed over all points on the image plane to produce OTF-weighted complex E-fields. The local real-valued intensity is detected at each point via conversion to photoelectrons, after which the circuitry integrates over a pixel area to get the total intensity in a pixel. The pixel integral of intensity is:

$$I_{Pixel}(r_P, \lambda, t) = \int_{pixel\ at\ Image\ Plane} \int d^2 r_F i_F(r_F, \lambda, t)$$

$$= \int_{pixel\ at\ Image\ Plane} \int d^2 r_F E_{F,Total}(r_F, \lambda, t) E^*_{F,Total}(r_F, \lambda, t)$$

$$= \left(\frac{f_P}{R}\right)^2 \int_{pixel\ at\ Object\ Plane} \int d^2 r_P E_{F,Total}(r_P, \lambda, t) E^*_{F,Total}(r_P, \lambda, t).$$

Equation (56)

Computing E-fields for separable optics facilitates the computation of the effects of diffraction on phase-sensitive imaging. A separable optical system is one in which a two-dimensional optical transfer function (OTF) can be expressed as an outer product of one-dimensional vectors, and applied to a function $F(E_O)$ of the object-scene optical fields $E_O$ to produce the optical fields at the image plane:

$$OTF(r_P, r_O) = Q_X(x_P + x_O) Q_Y(y_P + y_O) \quad \text{Equation (57)},$$

in which case:

$$\varepsilon_P(x_P, y_P) = \int dx_O \int dy_O Q_X(x_P, x_O) F(E_O(x_O, y_O)) Q_Y(y_P + y_O) \quad \text{Equation (58)}.$$

In matrix terms, a convolution of the form shown in Equation (58) can be re-written as a matrix product:

$$\varepsilon_P(x_P, y_P) = M_X(x_P, x_O) F(E_O(x_O, y_O)) M_y^T(y_P, y_O) \quad \text{Equation (59)}.$$

A clear lens can be simulated by specifying a throughput matrix T with elements $T(r_C)$ at each sub-element $r_C$, with $T(r_C)=1$ for transmissive and $T(r_C)=0$ for opaque elements. The lens is separable if there exist one-dimensional vectors $T_X$ and $T_Y$ such that:

$$T(r_C) = T_X(x_C) T_Y(y_C) \quad \text{Equation (60)}.$$

If the transmittance of a lensless aperture is separable, then the diffracted aperture has a separable OTF, which is discussed in U.S. Pat. No. 9,445,115 to DeWeert et al., which is incorporated by reference as if fully rewritten herein. For lensed apertures, the OTF of a diffracted separable aperture is also separable. To see this, consider Equation (53) in the absence of atmospheric effects, so that $\alpha_{Atmos}=0$ and $\beta_{Atmos}=0$, and with the polarization matrix ti constant for the entire aperture, so that:

$$Q\left(\frac{r_O}{R}, \frac{r_P}{R}\right) = \quad \text{Equation (61)}$$

$$Q_X\left(\frac{x_O + x_P}{R}\right) Q_Y\left(\frac{y_O + y_P}{R}\right) \exp\left(i\frac{\pi}{\lambda}(f_P - f_{Designed})\right)\tau,$$

where each axis of the imager has an OTF:

$$Q_X\left(\frac{x_O + x_P}{R}\right) = \frac{1}{N_X} \sum_{j_X=-N_X/2}^{N_X/2-1} T_X(x_c) \quad \text{Equation (62)}$$

-continued $$\left\{ \operatorname{sinc}\left[\pi \frac{a_X}{\lambda}\left(\frac{x_O + x_P}{R}\right)\left[1 + \frac{(f_P - f_{Designed})}{f_P}\right]\right]\right\}$$

$$\exp\left[-i\frac{2\pi}{\lambda}\left(\frac{x_O + x_P}{R}\right)x_C\right]\right\},$$

and $$Q_Y\left(\frac{y_O + y_P}{R}\right) = \frac{1}{N_Y} \sum_{j_Y=-N_Y/2}^{N_Y/2-1} T_Y(y_c) \quad \text{Equation (63)}$$

$$\left\{ \operatorname{sinc}\left[\pi \frac{a_Y}{\lambda}\left(\frac{y_O + y_P}{R}\right)\left[1 + \frac{(f_P - f_{Designed})}{f_P}\right]\right]\right\}$$

$$\exp\left[-i\frac{2\pi}{\lambda}\left(\frac{y_O + y_P}{R}\right)y_C\right]\right\}.$$

Because the matrix $$\exp\left(i\frac{\pi}{\lambda}(f_P - f_{Designed})\right)\tau$$

is constant for the entire aperture, we can define a Jones-vector function:

$$F(\varepsilon_O(x_O, y_O)) = \quad \text{Equation (64)}$$

$$\frac{N_X a_X N_Y a_Y}{R \lambda f_P} \exp\left(i\frac{\pi}{\lambda}(f_P - f_{Designed})\right)\tau \varepsilon_O(x_O, y_O)$$

so that Equation (50) becomes:

$$E_F(r_P, \lambda, t) \approx \quad \text{Equation (65)}$$

$$\sum_{x_O} \sum_{y_O} Q_X\left(\frac{x_O + x_P}{R}, t\right) F(\varepsilon_O(x_O, y_O, t)) Q_Y\left(\frac{y_O + y_P}{R}, t\right).$$

Equation (65) shows that a diffracted optical system, with an ideal lens is separable if the throughput mask $T(r_C)$ is separable and $\tau$ is constant. This holds true even if the lens is slightly defocused. Separability speeds up computations of two-dimensional diffraction kernels by reducing them to a pair of one-dimensional kernels. The diffraction kernels in Equation (65) are polarization-independent, so that the Jones vector components can be computed separately. That is, treat the optical field at the object as a pair of complex images, one for each of the two Jones components according to the following equation:

$$F(\varepsilon_O(r_O, t)) = F_1(\varepsilon_O(r_O, t)) \otimes \begin{pmatrix} 1 \\ 0 \end{pmatrix} + F_2(\varepsilon_O(r_O, t)) \otimes \begin{pmatrix} 0 \\ 1 \end{pmatrix} \quad \text{Equation (66)}$$

where $\otimes$ denotes a Kronecker product of matrices, then compute Equation (65) for $F_1$ and $F_2$ separately.

Figure 4:
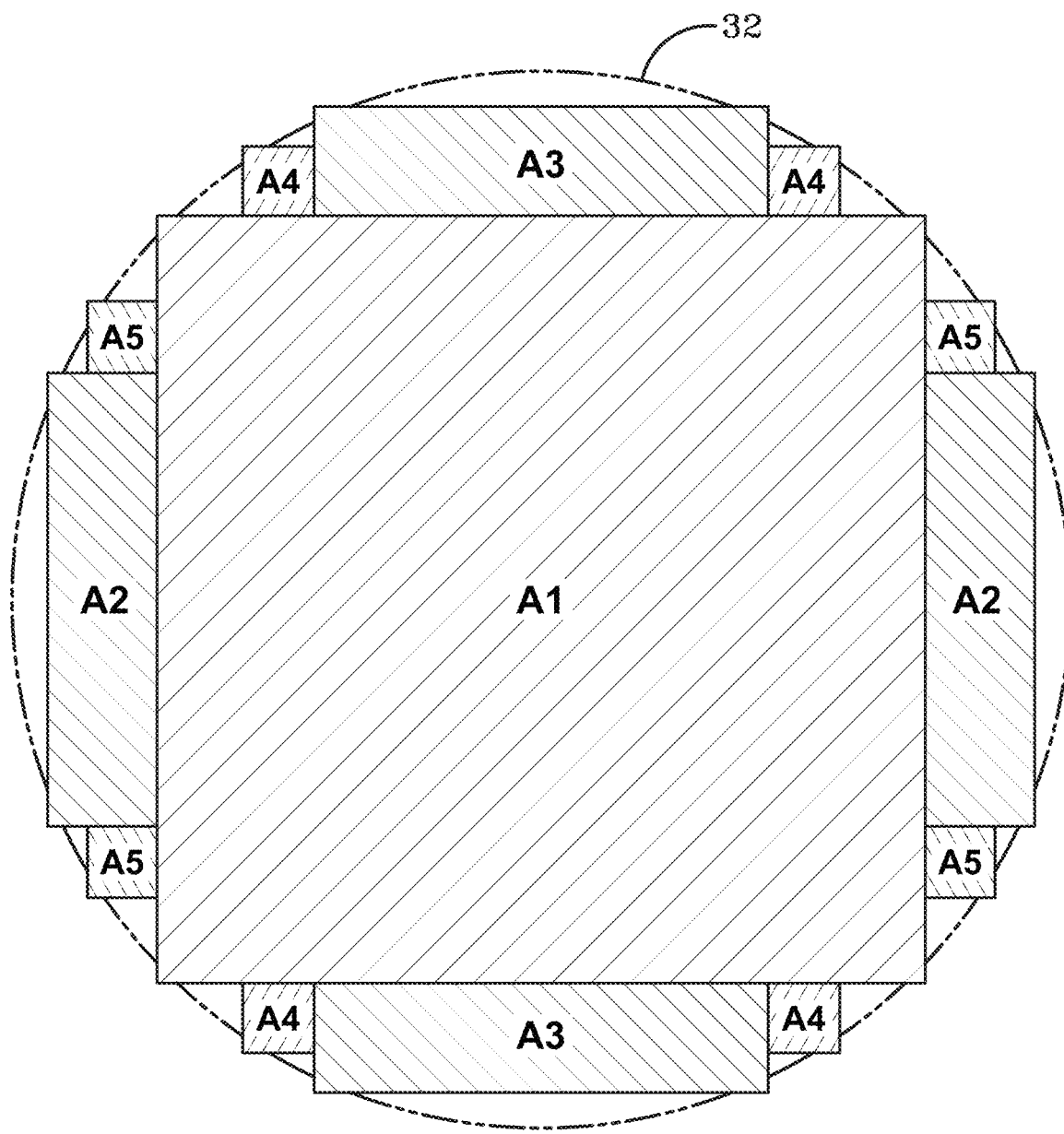
FIG. 4 is an example of a decomposition of a circular aperture into a sum of separable apertures with the same total area as the original aperture.

For simulations of imaging with generalized non-separable throughputs, one way to exploit separability is by approximating the aperture as a sum of separable apertures. An example of one such decomposition is shown in FIG. 4. FIG. 4 is an example of a decomposition of a circular aperture 32 into a sum of separable apertures, denoted as A1, A2, A3, A4, and A5, with the same total area as the original aperture 32. Other decompositions are possible, and the number of terms is adjustable to provide the desired level of accuracy in the simulation. For the $J^{th}$ separable aperture component, a pair $(Q_{X,J}, Q_{Y,J})$ is computed, then the E-fields arising from each are summed:

$$E_F(r_P, \lambda, t) \approx \qquad \text{Equation (67)}$$

$$\sum_{J=1}^{N_{Apers}} \sum_{x_O} \sum_{y_O} Q_{X,J}\left(\frac{x_O + x_P}{R}, t\right) F(\varepsilon_O(x_O, y_O, t))$$

$$Q_{Y,J}\left(\frac{y_O + y_P}{R}, t\right).$$

FIG. 4 shows a separable decomposition determined by analysis of the aperture shape. An alternative method is to compute a separable decomposition by singular-value decomposition (SVD).

Users of the systems and methods of the present disclosure choose decompositions having the minimum number of terms $N_{Apers}$ to achieve the desired accuracy, which for many purposes will be a single rectangular aperture. Another method, separation by singular-value decomposition, is described below.

Figure 5:
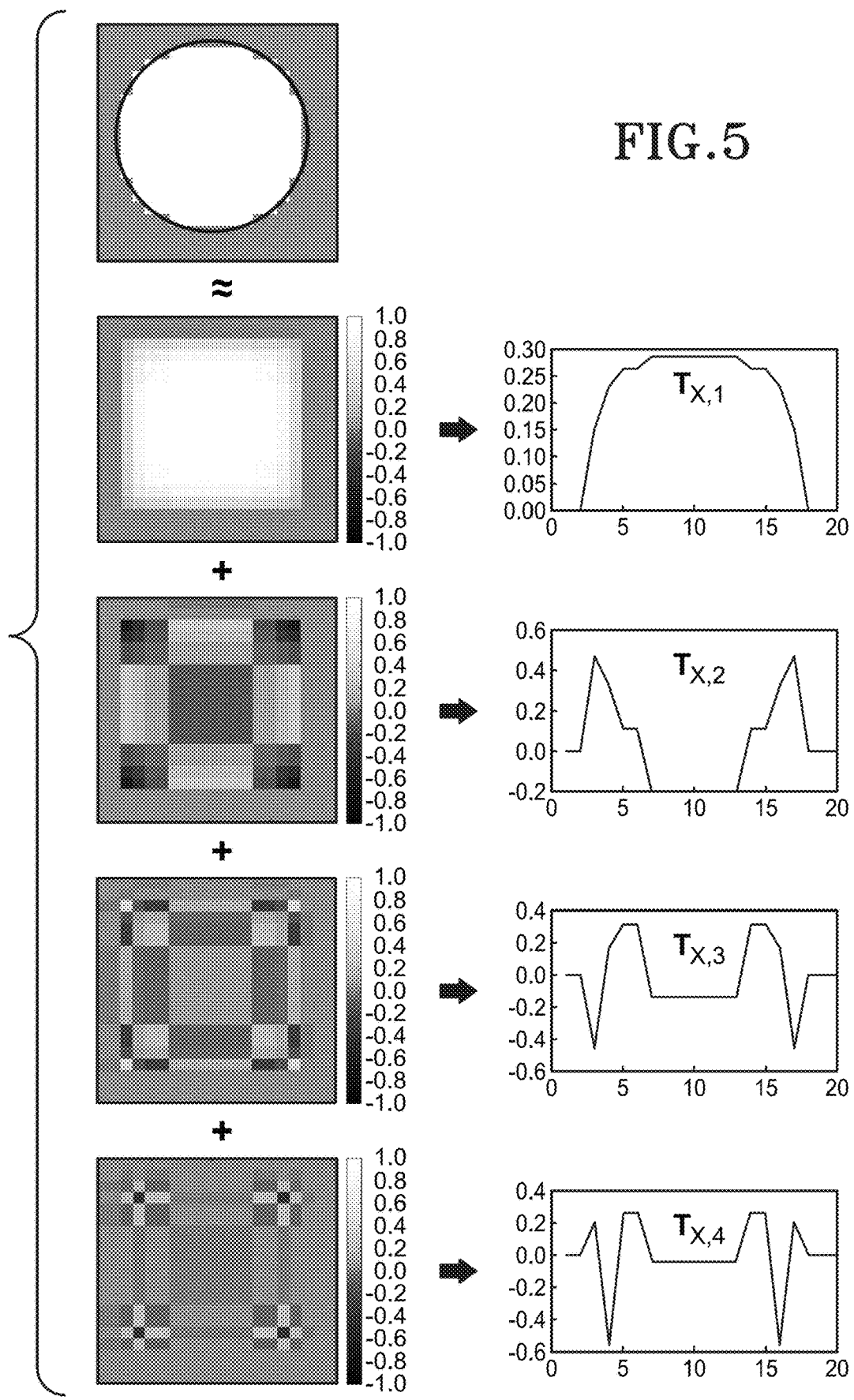
FIG. 5 is an example of a decomposition of a circular aperture into a sum of separable apertures via singular value decomposition (SVD), showing terms up to rank 4.

FIG. 5 shows an SVD decomposition of a circular aperture, approximated as a rank-four decomposition. In SVD, a two-dimensional matrix is expressed as a sum of outer products of one-dimensional vectors, weighted by eigenvalues of the decomposition. The rank of the SVD is the number of its non-zero eigenvalues. The example in FIG. 5 is for a circular aperture, so that each term in the SVD is an outer product of a vector $T_{X,J}$ with itself, where j is the eigenvalue index. In general, for arbitrarily-shaped apertures, each term in the composition would be an outer product of two distinct vectors, $T_{X,J}$ and $T_{Y,J}$. The rank of the SVD is chosen to provide a sufficiently-close approximation of the true aperture. SVD can give results not intuitively obvious to even analysts skilled in the art; an example being the negative-throughput contributions shown in FIG. 5.

For some cases, separability of the OTF may not occur automatically, even if the aperture throughput is separable and the aperture Jones matrix is constant. There are two solutions: Solution 1 includes dividing the aperture into multiple regions over which the atmospheric parameters are relatively constant. Then for each region J, define equations analogous to (61) and (62):

$$Q_{X,J}\left(\frac{x_O + x_P}{R}\right) = \frac{1}{N_X}\left(i\frac{\pi}{\lambda}\frac{1}{2}\alpha_{Atmos}(J)\right) \times \sum_{j_X=-N_X/2}^{N_X/2-1} T_X(x_C, J) \qquad \text{Equation (68)}$$

$$\left\{ \begin{array}{l} \text{sinc}\left[\pi\frac{a_X}{\lambda}\left(\frac{x_O + x_P}{R}\right)\right]\left[1 + \frac{(f_P - f_{Designed})}{f_P} + \right. \\ \left. \beta_{X,Atmos}(J)\right]\right] \times \exp\left[-i\frac{2\pi}{\lambda}\left(\left(\frac{x_O + x_P}{R}\right) + \right.\right. \\ \left.\left. \beta_{X,Atmos}(J)\right)x_C\right] \end{array} \right\},$$

and $$Q_{Y,J}\left(\frac{x_O + x_P}{R}\right) = \frac{1}{N_Y}\left(i\frac{\pi}{\lambda}\frac{1}{2}\alpha_{Atmos}(J)\right) \times \sum_{j_Y=-N_Y/2}^{N_Y/2-1} T_Y(x_C, J) \qquad \text{Equation (69)}$$

$$\left\{ \begin{array}{l} \text{sinc}\left[\pi\frac{a_Y}{\lambda}\left(\frac{y_O + y_P}{R}\right)\right]\left[1 + \frac{(f_P - f_{Designed})}{f_P} + \right. \\ \left. \beta_{Y,Atmos}(J)\right]\right] \times \exp\left[-i\frac{2\pi}{\lambda}\left(\left(\frac{y_O + y_P}{R}\right) + \right.\right. \\ \left.\left. \beta_{Y,Atmos}(J)\right)y_C\right] \end{array} \right\}.$$

In Equations (68) and (69), the throughputs $T_X(x_C, J)$ and $T_Y(y_C, J)$ are chosen to be zero outside the area where the atmospheric parameters are approximately equal to $\alpha_{Atmos}(J)$ and $\beta_{Atmos}(J)$. This leads to a division of the aperture into separable sub-apertures, which then are summed as in Equation (67).

Solution 2 is to decompose the generalized OTF, Equation (53), into a sum of separable terms via Singular-Value Decomposition (SVD). The output of SVD is a set of orthogonal x-vectors and a set of orthogonal y-vectors, such that:

$$Q(j, k) = \sum_{L=1}^{Lmax} \sigma_L Q_{X,L}(j) Q_{Y,L}(k), \qquad \text{Equation (70)}$$

where $\sigma_L$ is the $L^{th}$ singular value, and Lmax is the index of the least significant singular value. In this example, the transmittance of a circular aperture is approximated as a sum of separable terms computed by SVD, so that $$T = T = \sum_{l=1}^{rank} \sigma_l T_{X,l} T_{X,l}^T L\text{max}$$

is less than or equal to the rank of the decomposition. Rank is defined as the number of terms for which the SVD weights are significantly greater than zero.

Decomposition Solution 1 has the advantage of only requiring the one-dimensional OTFs to be computed, but may require many small sub-aperture terms to be generated. Solution 2 has the advantage of being implementable for any turbulence scale or aperture shape, with possibly fewer terms in the sum, but requires performing SVD on a large two-dimensional matrix. In practice, a user chooses the method which is computationally quickest, on a case-by-case basis. SVD is the preferred method for generalized decomposition, though other decomposition methods, such as by geometric analysis, are possible.

The brute-force approach to computing Equation (65) would be to treat the OTF as a generic two-dimensional matrix, $$Q\left(\frac{r_O + r_P}{R}\right),$$

then compute the two-dimensional convolutions of Q with $F_1$ and $F_2$. For large images, this is a resource-intensive computation, made more so by the requirements of phase-sensitive imaging wherein every pixel in the final image contains phase contributions from many points on the object plane. That is, the simulation must be computed at a much finer resolution than in the final image size, increasing the computational burden as a power-law function of image size. Separability of the OTF enables a method that is much faster, especially for large simulations, via doubly-Toeplitz matrix multiplications.

The doubly-Toeplitz method proceeds as follows: divide the object plane into elements of size ($\Delta x_O$, $\Delta y_O$), and define discretized object-scene matrices with elements:

$$F_j(j_O, k_O) = F_j(\varepsilon_O(j_O \Delta x_O, k_O \Delta y_O, t)) \quad \text{Equation (71)}.$$

Also define discretized version of the OTFs, with elements:

$$Q_X(j_O + j_P) = Q_X((j_O + j_P) \Delta x_O / R) \quad \text{Equation (72)},$$

and $$Q_Y(k_O + k_P) = Q_Y((k_O + k_P) \Delta y_O / R) \quad \text{Equation (73)}.$$

The image E-field is now explicitly a set of discretized equations:

$$E_{F,j}(j_P, k_P) \approx \sum_{j_O} \sum_{k_O} Q_X(j_O + j_P) F_j(j_O, k_O) Q_Y(k_O + k_P). \quad \text{Equation (74)}$$

The structure of Equation (74) is equivalent to multiplying a matrix of object-scene fields by two Toeplitz matrices, one for each axis of the image plane:

$$E_{F,j} = M_X F_j M_Y^T \quad \text{Equation (75)}.$$

The OTF has a finite extent in each direction, so that the aperture OTF matrix size is:

$$(A_{rows}, A_{cols}) \quad \text{Equation (76)}.$$

For computational convenience, $A_{rows}, A_{cols}$ are set to odd values, so that the integers $j_X$ in $Q_X(j_X)$ and $j_Y$ in $Q_Y(k_Y)$ range equally over positive and negative values: $-A_{Rows}/2 \leq j_X \leq +A_{Rows}/2$ and $-A_{Cols}/2 \leq j_X \leq +A_{Cols}/2$. This is not a limitation, since OTFs can be zero-padded with no effect on the results.

If the area of the image, before the final integration over pixels, has size:

$$(i_{rows}, i_{cols}) \quad \text{Equation (77)},$$

then the object extent that contributes to the OTF-weighted E-field is:

$$(O_{rows}, O_{cols}) = (A_{rows}, A_{cols}) + (i_{rows} - 1, i_{cols} - 1) \quad \text{Equation (78)}.$$

Equation (78) shows that the simulated object-plane area must be larger than the final image area to accommodate the optical transfer functions. The matrices $M_X$ and $M_Y$ can be written in Toeplitz form, which means that each row is a copy of the previous row, shifted by one column. Explicitly:

$$M_X(j_P, k_O) = Q_X\left(j_P + k_O - 2 - \frac{1}{2}(A_{Rows} - 1)\right), \quad \text{Equation (79)}$$

$$1 \leq j_P \leq i_{Rows}, \ 1 \leq k_O \leq O_{Cols},$$

and $$M_Y(k_P, j_O) = Q_X\left(k_P + j_O - 2 - \frac{1}{2}(A_{Cols} - 1)\right), \quad \text{Equation (80)}$$

$$1 \leq k_P \leq i_{Cols}, \ 1 \leq j_O \leq O_{Rows}.$$

Exemplary Toeplitz matrices $M_X$ and $M_Y$ are shown below, for the case in which the X and Y OTFs have only 3 significant components (i.e. for the case in which only three terms (−1, 0, +1) in the OTFs are significant, so that ($O_{rows}$, $O_{cols}$) = ($i_{rows}$ + 2, $i_{cols}$ + 2):

$$M_X = \begin{bmatrix} Q_X(-1) & Q_X(0) & Q_X(+1) & 0 & 0 & 0 & \cdots \\ 0 & Q_X(-1) & Q_X(0) & Q_X(+1) & 0 & 0 & \cdots \\ 0 & 0 & Q_X(-1) & Q_X(0) & Q_X(+1) & 0 & \cdots \\ 0 & 0 & 0 & Q_X(-1) & Q_X(0) & Q_X(+1) & \cdots \\ \vdots & & & & & & \end{bmatrix} \updownarrow i_{Rows}$$

$$\underbrace{\hphantom{Q_X(-1) \quad Q_X(0) \quad Q_X(+1) \quad 0 \quad 0 \quad 0 \quad \cdots}}_{O_{Cols}}$$

$$M_Y = \begin{bmatrix} Q_Y(-1) & Q_Y(0) & Q_Y(+1) & 0 & 0 & 0 & \cdots \\ 0 & Q_Y(-1) & Q_Y(0) & Q_Y(+1) & 0 & 0 & \cdots \\ 0 & 0 & Q_Y(-1) & Q_Y(0) & Q_Y(+1) & 0 & \cdots \\ 0 & 0 & 0 & Q_Y(-1) & Q_Y(0) & Q_Y(+1) & \cdots \\ \vdots & & & & & & \end{bmatrix} \updownarrow i_{Cols}$$

$$\underbrace{\hphantom{Q_Y(-1) \quad Q_Y(0) \quad Q_Y(+1) \quad 0 \quad 0 \quad 0 \quad \cdots}}_{O_{Rows}}$$

In general, there can be more OTF components, or as few as one. Each row is a copy of the row above, shifted by one column.

In order to simulate phase-sensitive imaging, the phase and polarization of the illuminating light are simulated, as well as the phase and polarization shifts introduced by the reflective or transmissive surface.

There are multiple length scales in optical-phase-sensitive imaging, including, but not limited to, the wavelength of light, the extent of the OTF, the resolution or pixelization of the image plane, the atmospheric phase-screen tip/tilt variability scale, the depolarization correlation distance of the surface, and the phase-roughness correlation distance of the surfaces. Of these length scales, the ones not so far considered in the present disclosure are depolarization and roughness.

The systems and methods of the present disclosure partition the surface elevation into a macroscopically-varying elevation $h_{Macro}$ and a microscopic roughness texture $h_{Texture}$ so that the net height is:

$$h(r_O,t) = h_{Macro}(r_O,t) + h_{Texture}(r_O,t) \quad \text{Equation (81)}.$$

The macroscopic elevation is deterministic, and can vary in time, for example, if the surface is vibrating in response to sound or seismic activity. The texture term captures statistically-distributed features that are small in absolute amplitude, but significant on the scale of a wavelength of light. For a surface texture with an rms variability $\sigma_{Texture}$, the correlation function between two points separated by a distance D is:

$$C(D) = \frac{1}{\sigma_{Texture}^2} \langle h_{Texture}(r) h_{Texture}(r+D) \rangle. \quad \text{Equation (82)}$$

To model the surface statistics, the systems and methods of the present disclosure uses a hybrid Gaussian-exponential correlation function which combines Gaussian central regions with exponential tails. The correlation function in the systems and methods of the present disclosure is given by:

$$C(D) = \exp\left[-\frac{D^2}{\Lambda_G^2 + |D|\Lambda_E}\right], \quad \text{Equation (83)}$$

and has a total power of:

$$p_{Total} = \int\int d^2D\, C(D) = 2\pi \int_0^\infty dD\, D \exp\left[-\frac{D^2}{\Lambda_G^2 + \Lambda_E D}\right]. \quad \text{Equation (84)}$$

At very long ranges, the correlation in Equation (83) reduces to an exponential distribution, and at very short ranges, it is Gaussian. The exponential correlation provides a "fat-tailed" distribution that describes long-range correlations, while the Gaussian portion prevents un-physical cusps as the correlation distance goes to zero; however, the teachings of the present disclosure are not limited to Gaussian-exponential distributions. Other correlation functions are also usable, including, but not limited to, directional distributions in which the correlation parameters depend on direction.

The power spectrum of the correlation in Equation (83) is the Fourier transform:

$$P(k) = \int\int d^2D\, C(D) \quad \text{Equation (85)}$$

$$= \int\int d^2D \exp(-2\pi i k \cdot D) \exp\left[-\frac{D^2}{\Lambda_G^2 + \Lambda_E |D|}\right]$$

$$= 2\pi \int_0^\infty dD\, D J_0(2\pi k D) \exp\left[-\frac{D^2}{\Lambda_G^2 + \Lambda_E D}\right],$$

where $J_0$ is a zeroth-order Bessel function, since:

$$\int_0^{2\pi} d\varphi \exp(-i 2\pi k D \cos\varphi) = 2\pi J_0(2\pi k D). \quad \text{Equation (86)}$$

Equation (85) does not have an analytic solution, so the systems and methods of the present disclosure evaluates it numerically, then normalizes it so that the sum over all k-components is unity:

$$P_{Normalized}(k) = P(k)/(\iint d^2k'\, P(k')) \quad \text{Equation (87)}.$$

For each k-component, the systems and methods of the present disclosure selects a random Gaussian-distributed number with mean zero and standard deviation one, then multiplies by $\sigma_{Texture}$ and the square root of the normalized PSD to obtain an array of weights:

$$w(k) = \text{rand}_{Gaussian}(k) \times \sigma_{Texture} \times \sqrt{P_{Normalized}(k)} \quad \text{Equation (88)}$$

The weights w(k) are then inverse transformed back to real space to provide a realization of the surface roughness:

$$h_{Texture}(r_O,t) = \iint d^2k \exp(2\pi i k \cdot r_O) w(k) \quad \text{Equation (89)}$$

The reflection of a polarized light source illuminating a surface can be depolarized by a variety of mechanisms, such as multiple-scattering between soil particles, multiple scattering within translucent materials, and birefringent transmittance through translucent grains. Accounting for these effects is especially important for natural surfaces which may have heterogeneous composition. Like roughness texture, depolarization can have long-range correlations, and does not necessarily have the same correlation lengths as the surface roughness. For natural surfaces, with statistically-distributed depolarization, the systems and methods of the present disclosure implements the Jones matrix that describes depolarization as:

$$\tau_{Depol}(r_O, t) = \quad \text{Equation (90)}$$

$$\begin{pmatrix} \cos\theta_{Rot} & \sin\theta_{Rot} \\ -\sin\theta_{Rot} & \cos\theta_{Rot} \end{pmatrix} \begin{pmatrix} \exp(i\phi_{Bi}/2) & 0 \\ 0 & \exp(-i\phi_{Bi}/2) \end{pmatrix}.$$

In Equation (90), $\theta_{Rot}(r_O,t)$ is the polarization-rotation angle, and $\phi_{Bi}(r_O,t)$ is the birefringent phase shift. Together, the angles $\theta_{Rot}$ and $\phi_{Bi}$ give elliptical polarization shifts. If the surface is composed of many randomly-distributed small particles or facets, then the angles are statistically distributed. Both angles $\theta_{Rot}$ and $\phi_{Bi}$ may also depend on time, for example, if motion of the surface causes grain orientations or separations to change. One example of the use of the systems and methods of the present disclosure is to consider the initial distributions of $\theta_{Rot}$ and $\phi_{Bi}$ distributed according to independent hybrid Gaussian-exponential correlation functions:

$$C_\theta(D) = \exp\left[-\frac{D^2}{\Lambda_{G,\theta}^2 + D\Lambda_{E,\theta}}\right], \quad \text{Equation (91)}$$

and $$C_\phi(D) = \exp\left[-\frac{D^2}{\Lambda_{G,\phi}^2 + D\Lambda_{E,\phi}}\right]. \quad \text{Equation (92)}$$

The procedure for creating the distributions of angles follows the teachings described for the roughness simulation, Equations (85), (86), and (88), and associated discussions, replacing the rms roughness parameter $\sigma_h$ with an rms rotation angle $\sigma_{Rot}$ and an rms birefringence angle $\sigma_{Bi}$. Other distributions are possible, and the distributions $\theta_{Rot}$, $\phi_{Bi}$ can also be correlated with each other and the roughness texture. In one example, model parameters for the surfaces are determined empirically, from the observed surface properties.

The surface is assumed to have a reflectance $\rho_{Surf}(r_O)$ that varies from point to point. In analogy with the roughness variability, reflectance variation can be divided between macroscopic, such as, for example, grass versus concrete, and texture terms:

$$\rho_{Surf}(r_O,t) = \rho_{Macro}(r_O,t) + \rho_{Texture}(r_O,t) \qquad \text{Equation (93)}.$$

Each type of surface also can have a reflectance texture of small variations of reflectance about the mean reflectance for each surface type. These reflectances are also captured in the simulations via light-wavelength-dependent Gaussian-exponential power spectrum analogous to the roughness and polarization terms, with parameters $\Lambda_{G,Refl}$, $\Lambda_{E,Refl}$, and $\sigma_{Refl}$.

Figure 6:
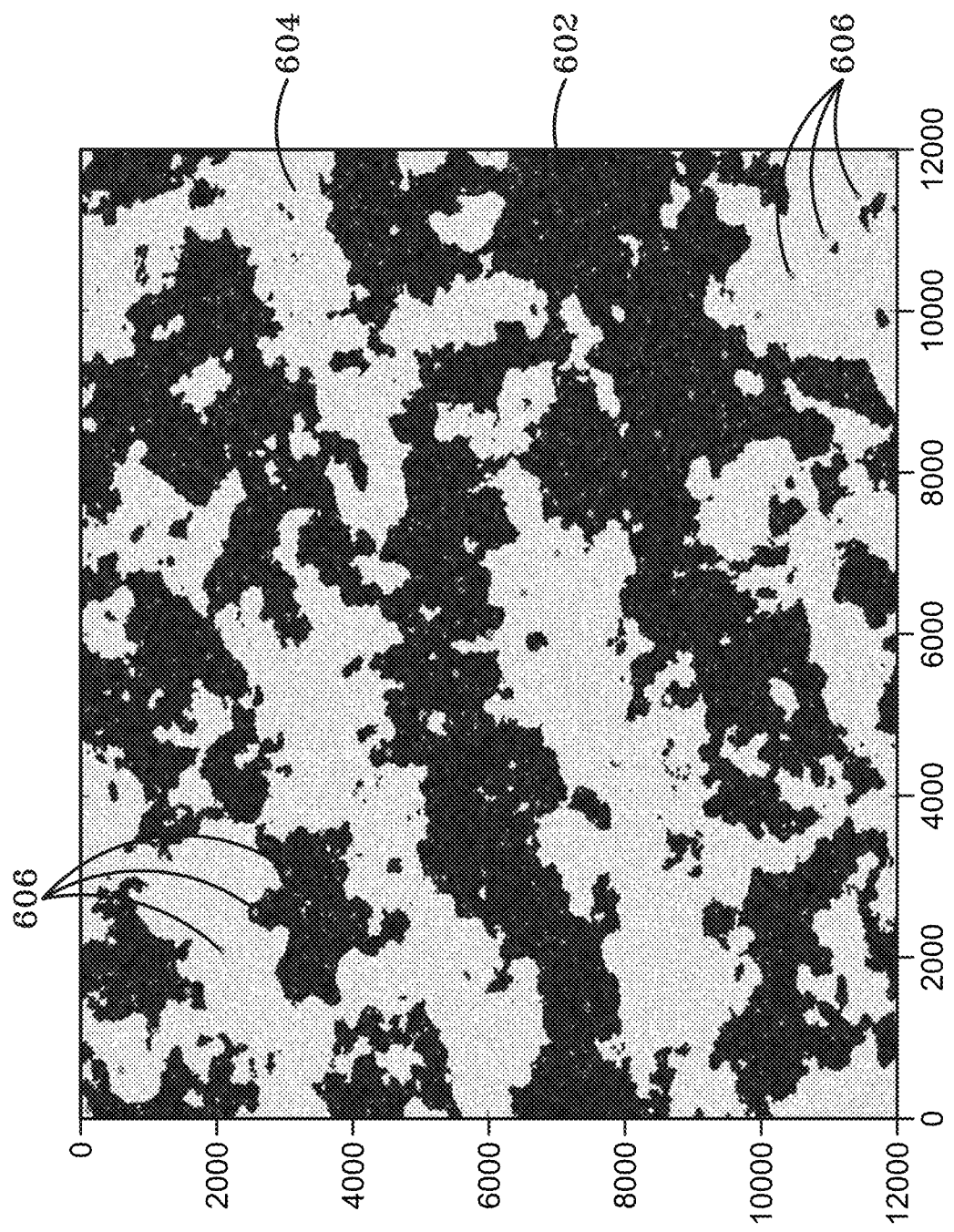
FIG. 6 is an exemplary simulated surface with three kinds of macroscopic reflectance, i.e., two background materials and a line of identical simulated debris items.

FIG. 6 is an example of a simulated surface with three kinds of macroscopic reflectance (i.e., two background materials and a line of identical simulated debris items). Within each surface type, the reflectance, de-polarization, and elevation each have a texture that varies statistically. The dark areas, denoted as 502, are grass, the light areas, denoted as 504, are sand, and the circular areas, denoted as 506, are simulated debris items. Each material has variable reflectance, as well as surface-roughness textures to provide microscopic roughness to generate laser speckle.

The surface is illuminated by a light source with a user-specified Jones vector, phase, and intensity at each point. The incident light field $\varepsilon_{incident}(r_O,t)$ is then operated on by the reflectance, roughness and depolarization to produce the object-scene light field according to the following equation:

$$\varepsilon_O(r_O, t) = \rho(r_O)\tau_{Depol}(r_O, t)\varepsilon_{Incident}(r_O, t)\exp\left(2i\frac{2\pi}{\lambda}h(r_O, t)\right). \qquad \text{Equation (94)}$$

The factor of 2 in the exponential term in Equation (94) is due to the two-way propagation of light over the surface elevation. The illuminating source is assumed to be coherent and polarized. Non-normal incidence on the surface is simulated by a location-dependent phase shift that depends on the incidence angle and direction. The incident polarization is conveyed by Jones vectors that can vary from point to point on the object plane.

Speckles have unbounded brightness, and, therefore, speckles can dominate the statistics of the image of a scene, irrespective of any reflectance variations. For coherently-illuminated scenes, laser speckle is typically the greatest noise source, but other noise sources can be significant, especially for pixels within dark speckles. The systems and methods of the present disclosure includes provisions for photon-counting (shot) noise, excess noise factor, fixed-pattern noise, dark noise, and digitizer noise. These noise sources operate on the intensity in each pixel, with the details of the noise distributions specific to each imaging system. An example is a noise model represented pixel-by-pixel as:

$$I_{Pixel,Noisy} = G \times I_{Pixel} + N_{Non\text{-}Speckle} + \text{offset} \qquad \text{Equation (95)},$$

where $$N_{Non\text{-}Speckle} = \{N_{Photon\_Counting} + N_{Dark} + N_{Digitizer}\} \qquad \text{Equation (96)}.$$

$N_{Photon\_Counting}$, $N_{Dark}$, and $N_{Digitizer}$, are specific random realizations of noise values (in imaging system-output units) due to, respectively: photon counting with an excess noise factor, dark noise, and digitizer noise. G is the gain, including quantum efficiency and any pixel-to-pixel gain variations, for converting raw signal on the focal plane to imaging system-output signal units, and offset is the mean signal output in the absence of light. For photon-counting noise with an excess noise factor, the usual discrete Poisson noise distribution is replaced by a continuous distribution, selectable to be gamma or log-normal, with means and variances in each pixel adjusted to account for the excess noise factor. The photon counting noise is applied to the input intensity, which already includes laser-speckle variations.

Figure 7:
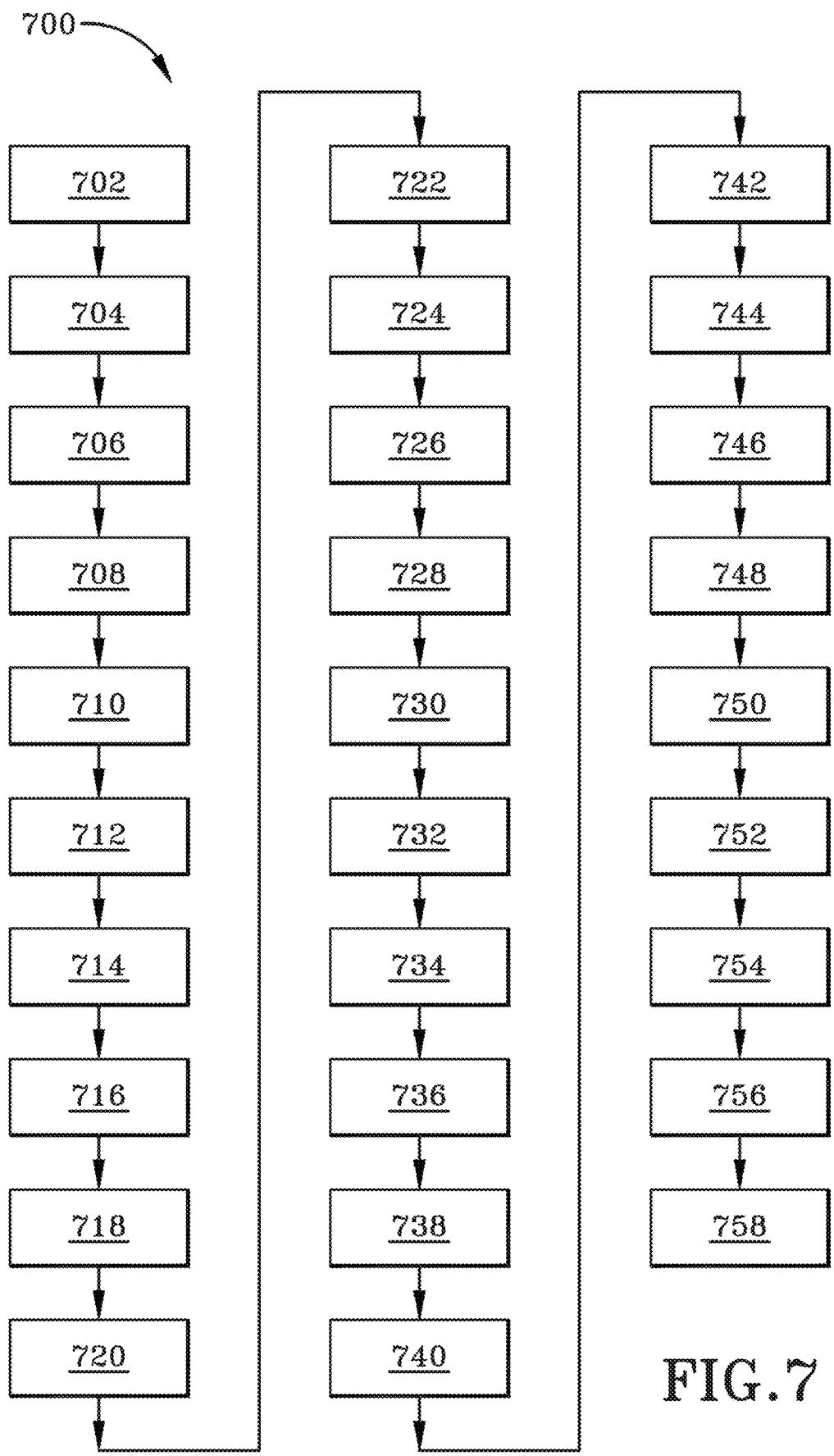
FIG. 7 is a flowchart in accordance with one embodiment of the present disclosure.

FIG. 7 depicts a flowchart of a method for computationally simulating an optical image generally at 700. Method 700 includes generating a simulated scene having at least one variable optical property, which is shown generally at 702. The method 700 includes computing an optical transfer function (OTF) via at least one computed phase screen, which is shown generally at 704. The method 700 includes expressing the OTF as a sum of at least one separable OTF, which is shown generally at 706. The method 700 includes convolving the at least one separable OTF with the simulated scene to simulate electromagnetic (EM) fields of the optical image, which is shown generally at 708. The method 700 includes computing image intensities of the optical image from the simulated EM fields of the optical image, which is shown generally at 710. The method 700 further includes simulating at least one illuminating source, which is shown generally at 712. The method 700 further includes determining an optical phase of the at least one illuminating source, which is shown generally at 714. The method 700 further includes providing at least one object in the simulated scene, which is shown generally at 716. The method 700 further includes generating a roughness phase texture of the at least one object, which is shown generally at 718. The method 700 further includes determining fine-scale EM phase modulation of the roughness phase texture, which is shown generally at 720. The method 700 further includes illuminating the simulated scene with the at least one illuminating source, which is shown generally at 722. The method 700 further includes determining at least one optical phase of the simulated scene based, at least in part, on the phase of the at least one illuminating source and the fine-scale EM phase modulation of the roughness phase texture, which is shown generally at 724.

The method 700 further includes determining polarization Jones vectors of the at least one illuminating source, which is shown generally at 726. The method 700 further includes generating a polarization texture of the at least one object, which is shown generally at 728. The method further includes determining fine-scale EM polarization modulation of the polarization texture, which is shown generally at 730. The method 700 further includes determining polarization Jones vectors describing a polarization of the simulated scene based, at least in part, on the polarization Jones vectors of the at least one illuminating source and the fine-scale EM polarization modulation of the polarization texture, which is shown generally at 732.

The method 700 further includes determining an optical reflectance of the at least one illuminating source, which is shown generally at 734. The method 700 further includes generating an optical reflectance texture of the at least one object, which is shown generally at 736. The method 700 further includes determining optical reflectance information of the optical reflectance texture, which is shown generally at 738. The method 700 further includes determining an optical reflectance of the simulated scene based, at least in part, on the optical reflectance of the at least one illuminating source and the optical reflectance information of the optical reflectance texture, which is shown generally at 740.

The method 700 further includes creating left and right matrices $M_X$ and $M_Y$ for each OTF of the sum of the at least one separable OTF, which is shown generally at 742. The method 700 further includes multiplying the left and right matrices $M_X$ and $M_Y$ by outgoing EM-fields at an object plane of a simulated optical system to create complex EM-field terms for each OTF of the sum of the at least one separable OTF, which is shown generally at 744. The method 700 further includes summing the complex EM-field terms computed from each OTF of the sum of the at least one separable OTF to create a net EM-field received at an image sensor of the simulated optical system, which is shown generally at 746. The method 700 further includes computing EM radiation intensity on the image plane of the simulated optical system, which is shown generally at 748. The method 700 further includes binning the EM radiation intensity on the image plane to a final resolution to create a speckle image, which is shown generally at 750. The method 700 further includes computing non-speckle noise simulation, which is shown generally at 752. The method 700 further includes adding the non-speckle noise simulation to the speckle image to create the optical image, which is shown generally at 754.

In one example, the left and right matrices $M_X$ and $M_Y$ are Toeplitz matrices. In one example, expressing the OTF as the sum of at least one separable OTF is accomplished via analysis of optics geometry of a simulated optical system. In another example, expressing the OTF as the sum of at least one separable OTF is accomplished via analysis of atmospheric distortions. In yet another example, expressing the OTF as the sum of at least one separable OTF is accomplished via singular value decomposition (SVD).

In one example, the method 700 further includes illuminating the simulated scene with at least one coherent light source, which is shown generally at 756. In one example, the at least one coherent light source is at least one laser. In another example, the method 700 further includes illuminating the simulated scene with at least one incoherent light source, which is shown generally at 758.

FIG. 8 depicts a flowchart of a method of computing an optical transfer function (OTF) generally at 800. Method 800 includes computing the OTF via at least one computed phase screen, which is shown generally at 802. The method 800 further includes representing at least one phase-sensitive effect of a simulated optical system via the at least one computed phase screen, which is shown generally at 804. In one example, the at least one phase-sensitive effect is at least one effect of an ideal lens. In another example the at least one phase-sensitive effect is at least one effect of a lens having at least one defocus parameter. In another example, the at least one phase-sensitive effect is at least one effect of a lens having at least one aberration. In yet another example, the at least one phase-sensitive effect is at least one effect of atmospheric turbulence.

FIG. 9 depicts a flowchart of a method of convolving an optical transfer function (OTF) with a simulated scene generally at 900. Method 900 includes computing a separability of the OTF, which is shown generally at 902. The method 900 further includes expressing the OTF as a sum of at least one separable OTF, which is shown generally at 904. The method 900 further includes creating left and right matrices $M_X$ and $M_Y$ for each OTF of the sum of the at least one separable OTF, which is shown generally at 906. The method 900 further includes multiplying the left and right matrices $M_X$ and $M_Y$ by outgoing EM-fields at an object plane of a simulated optical system to create complex EM-field terms for each OTF of the sum of the at least one separable OTF, which is shown generally at 908. The method 900 further includes summing the complex EM-field terms computed from each OTF of the sum of the at least one separable OTF to create a net EM-field received at an image sensor of the simulated optical system, which is shown generally at 910. In one example, the left and right matrices $M_X$ and $M_Y$ are Toeplitz matrices. The method 900 further includes computing the OTF via at least one computed phase screen, which is shown generally at 912.

The systems and methods of the present disclosure may further include determining optics parameters (e.g., aperture size, f/#, aberrations, throughput, wavelengths, etc.), determining resolution of the simulation (i.e. a resolution that is finer than the final image resolution, generating surface simulation (e.g., large-scale characteristics and textures of surface reflectances, roughness, and depolarization), simulating intensity, polarization, and phase of incoming coherent illumination at each point on surface, which is also known as the object plane, applying surface-simulation parameters to simulated illumination to simulate out-going E-fields at the object plane, setting up, if necessary, a computed atmospheric phase screen, determining a method for creating separable OTFs (e.g., optic geometry, atmospheric distortion scale, or generalized SVD), computing separable OTFs via computed phase screens for a finite number of screen terms, creating left and right matrices $M_X$ and $M_Y$ for each separable OTF pair $Q_X$ and $Q_Y$, multiplying matrices by outgoing e-field at object plane to create a complex E-field term in the sum image sum, summing complex terms over all separations to compute the net E-field, computing intensities on image plane, binning intensities to final resolution to create speckle image, computing non-speckle noise simulation and adding to speckle image to compute final image. For multi-band imaging, various methods of the present disclosure can be performed for each wavelength. More particularly, for multi-band laser imaging, separate computations are performed for each wavelength, with the reflectance and microtextures of the scene specified for each band. Simulation of incoherent or unpolarized light is done by computing E-fields for multiple realizations of the simulation with different polarizations or incident phases, then summing the resultant E-fields before computing intensities.

Figure 10A:
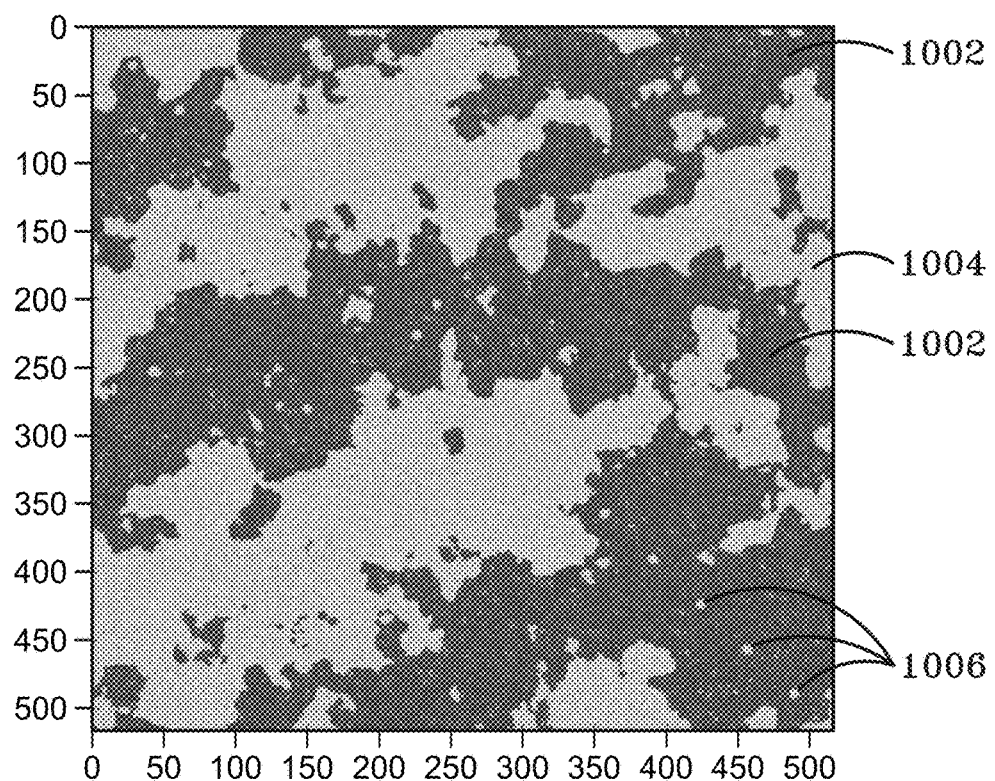
FIG. 10A is an exemplary simulated optical image representing a first band having a receiver that is co-polarized with respect to the incident polarized laser source.
Figure 10B:
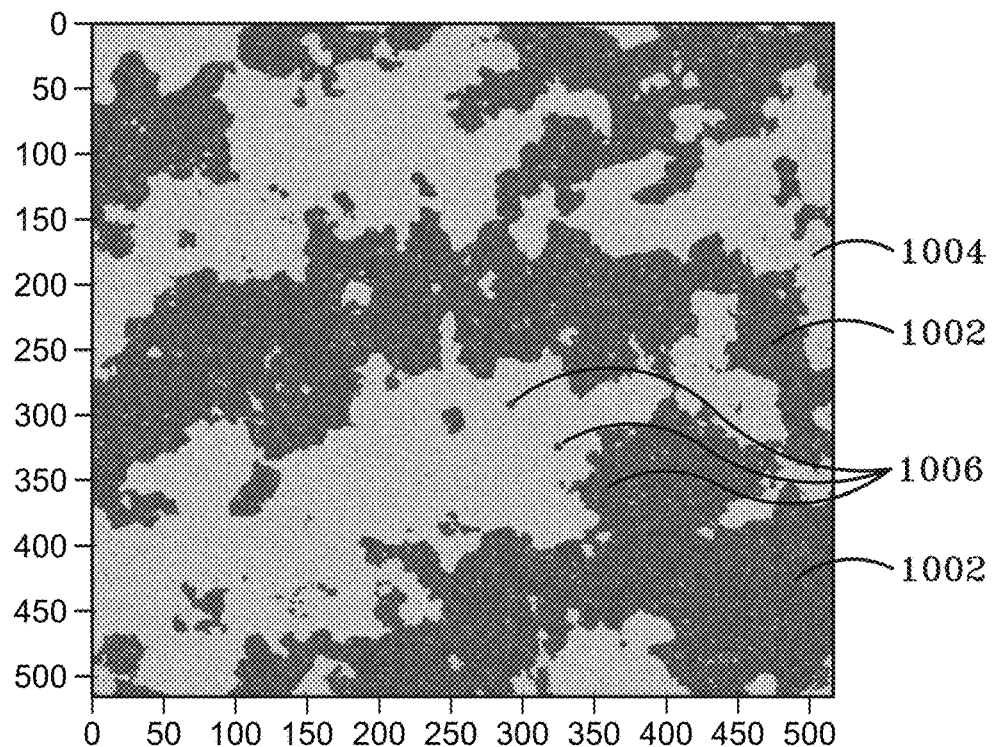
FIG. 10B is an exemplary simulated optical image representing a first band having a receiver that is cross-polarized with respect to the incident polarized laser source.
Figure 10C:
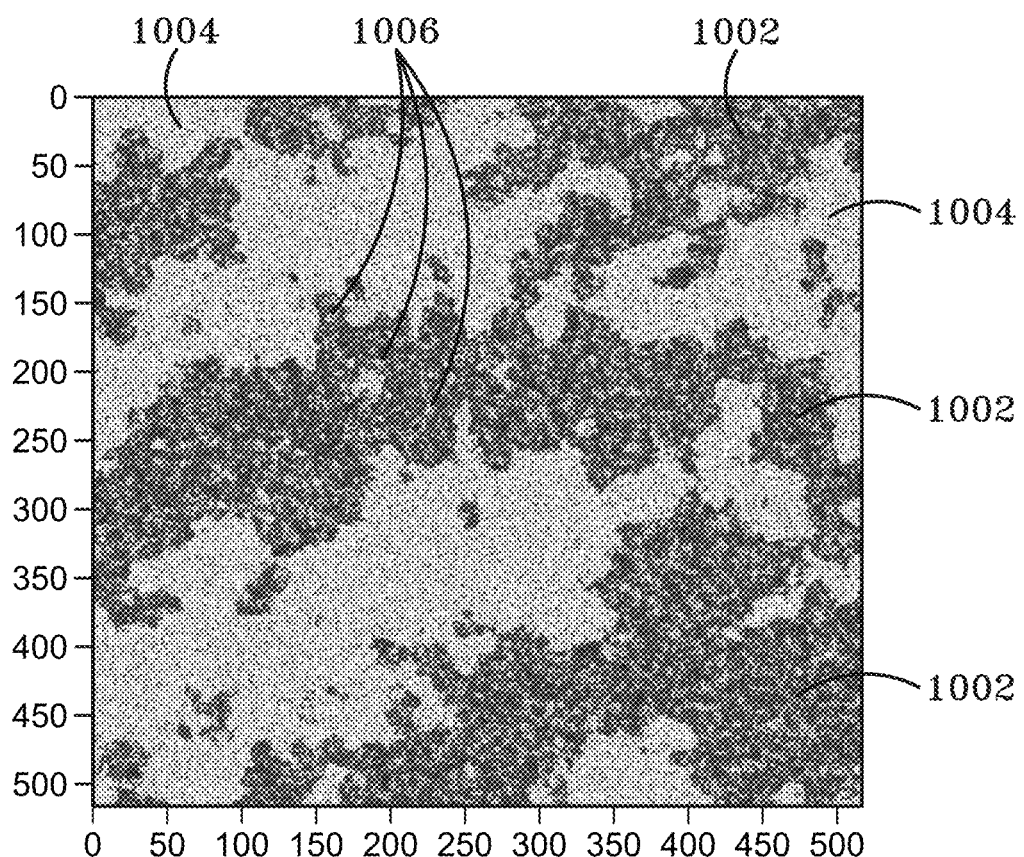
FIG. 10C is an exemplary simulated optical image representing a second band where light has been summed over polarization directions to simulate a net un-polarized receiver.

FIG. 10A, FIG. 10B, and FIG. 10C are exemplary multi-band simulation outputs of the systems and methods of the present disclosure. The dark areas, denoted as 1002, are grass, the light areas, denoted as 1004, are sand, and the circular areas, denoted as 1006, are simulated debris items. FIG. 10A represents a first band having a receiver that is co-polarized with respect to the incident polarized laser source, FIG. 10B represents the first band having a receiver that is cross-polarized with respect to the incident polarized laser source, and FIG. 10C represents a second band where light has been summed over polarization directions to simulate a net un-polarized receiver. The circular areas 1006 are bright versus the dark areas 1002 in the co-polarized first band. The circular areas 1006 are dark versus the light areas 1004 in the cross-polarized first band. Further, the effects of laser speckle are evident in each image, showing an unbounded variation of intensity that is much greater than the reflectance variations in each material type. In this simulation, the illuminating lasers were one hundred percent polarized, and surface effects provided de-polarization to put light into multiple polarization states.

Figure 11:
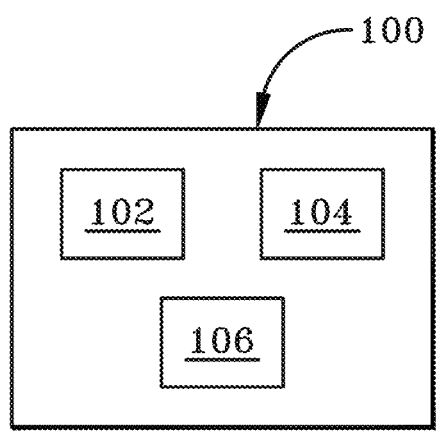
FIG. 11 is an exemplary simulator system in accordance with the present disclosure.

It is to be understood that the above-described methods 700, 800, and 900 may be implemented via any suitable simulator system, such as, for example, a simulator system depicted in FIG. 11 and denoted as 100. The simulator system 100 includes at least one non-transitory computer readable storage medium 102 having instructions encoded thereon that, when executed by at least one processor 104, implements various logics 106 for implementing the above-described methods 700, 800, and 900. More particularly, the at least one non-transitory computer readable storage medium 102 having instructions encoded thereon that, when executed by at least one processor 104, implements various logics to computationally simulate an optical image, compute an optical transfer function (OTF), and convolve an optical transfer function (OTF) with a simulated scene.

It should be noted that laser imaging is sensitive to phase through the phenomenon of laser speckle. Laser speckle distinguishes coherent laser illumination from incoherent illumination. For example, illuminating a scene with multi-colored light will yield a multi-band image from which the relative reflectances of the bands can be computed on a pixel-by pixel basis. With laser speckle, each pixel has an inherently random, unbounded intensity that is uncorrelated between illumination bands, so that the relative reflectances for each band can only be inferred by analyzing multiple pixels, or multiple laser images with independent incident phases. The optical aperture, f/#, and pixelization all affect the resulting image. Accurate prediction of laser imaging performance therefore requires accounting for optical phase, which is accomplished by systems and methods of the present disclosure and methods by applying separable phase screens with Jones-vector representations of polarization.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for computationally simulating an optical image comprising:
   generating a simulated scene having at least one variable optical property;
   computing an optical transfer function (OTF) via at least one computed phase screen;
   expressing the OTF as a sum of at least one separable OTF;
   convolving the at least one separable OTF with the simulated scene to simulate electromagnetic (EM) fields of the optical image; and
   computing image intensities of the optical image from the simulated EM fields of the optical image.

2. The method of claim 1, wherein generating the simulated scene having at least one variable optical property further comprises:
   simulating at least one illuminating source;
   determining an optical phase of the at least one illuminating source;
   providing at least one object in the simulated scene;
   generating a roughness phase texture of the at least one object;
   determining fine-scale EM phase modulation of the roughness phase texture;
   illuminating the simulated scene with the at least one illuminating source; and
   determining at least one optical phase of the simulated scene based, at least in part, on the phase of the at least one illuminating source and the fine-scale EM phase modulation of the roughness phase texture.

3. The method of claim 2, further comprising:
   determining polarization Jones vectors of the at least one illuminating source;
   generating a polarization texture of the at least one object;
   determining fine-scale EM polarization modulation of the polarization texture; and
   determining polarization Jones vectors describing a polarization of the simulated scene based, at least in part, on the polarization Jones vectors of the at least one illuminating source and the fine-scale EM polarization modulation of the polarization texture.

4. The method of claim 2, further comprising:
   determining an optical reflectance of the at least one illuminating source;
   generating an optical reflectance texture of the at least one object;
   determining optical reflectance information of the optical reflectance texture; and
   determining an optical reflectance of the simulated scene based, at least in part, on the optical reflectance of the at least one illuminating source and the optical reflectance information of the optical reflectance texture.

5. The method of claim 1, further comprising:
   creating left and right matrices $M_X$ and $M_Y$ for each OTF of the sum of the at least one separable OTF;
   multiplying the left and right matrices $M_X$ and $M_Y$ by outgoing EM-fields at an object plane of a simulated optical system to create complex EM-field terms for each OTF of the sum of the at least one separable OTF;
   summing the complex EM-field terms computed from each OTF of the sum of the at least one separable OTF to create a net EM-field received at an image sensor of the simulated optical system;
   computing EM radiation intensity on the image plane of the simulated optical system;
   binning the EM radiation intensity on the image plane to a final resolution to create a speckle image;
   computing non-speckle noise simulation; and
   adding the non-speckle noise simulation to the speckle image to create the optical image.

6. The method of claim 5, wherein the left and right matrices $M_X$ and $M_Y$ are Toeplitz matrices.

7. The method of claim 1, wherein expressing the OTF as the sum of at least one separable OTF is accomplished via analysis of optics geometry of a simulated optical system.

8. The method of claim 1, wherein expressing the OTF as the sum of at least one separable OTF is accomplished via analysis of atmospheric distortions.

9. The method of claim 1, wherein expressing the OTF as the sum of at least one separable OTF is accomplished via singular value decomposition (SVD).

10. The method of claim 1, further comprising:
    illuminating the simulated scene with at least one coherent light source.

11. The method of claim 10, wherein the at least one coherent light source is at least one laser.

12. The method of claim 1, further comprising:
    illuminating the simulated scene with at least one incoherent light source.

13. A method of convolving an optical transfer function (OTF) with a simulated scene comprising:
    computing a separability of the OTF;
    expressing the OTF as a sum of at least one separable OTF;
    creating left and right matrices $M_X$ and $M_Y$ for each OTF of the sum of the at least one separable OTF;
    multiplying the left and right matrices $M_X$ and $M_Y$ by outgoing EM-fields at an object plane of a simulated optical system to create complex EM-field terms for each OTF of the sum of the at least one separable OTF; and
    summing the complex EM-field terms computed from each OTF of the sum of the at least one separable OTF to create a net EM-field received at an image sensor of the simulated optical system.

14. The method of claim 13, wherein the left and right matrices $M_X$ and $M_Y$ are Toeplitz matrices.

15. The method of claim 13, further comprising:
    computing the OTF via at least one computed phase screen.

* * * * *